(12) United States Patent
Nishida et al.

(10) Patent No.: US 8,376,300 B2
(45) Date of Patent: Feb. 19, 2013

(54) APPARATUS WITH A ROTATING BODY

(75) Inventors: Ryuhei Nishida, Yokohama (JP); Keiji Yamaguchi, Yokohama (JP); Takehiko Nemoto, Yokohama (JP)

(73) Assignee: NIFCO Inc., Yokohama-Shi (JP)

( * ) Notice: Subject to any disclaimer, the term of this patent is extended or adjusted under 35 U.S.C. 154(b) by 0 days.

(21) Appl. No.: 13/349,177

(22) Filed: Jan. 12, 2012

(65) Prior Publication Data

US 2012/0104208 A1 May 3, 2012

Related U.S. Application Data

(62) Division of application No. 12/285,385, filed on Oct. 3, 2008, now Pat. No. 8,186,638.

(30) Foreign Application Priority Data

Apr. 8, 2008 (JP) .................... 2008-100663
Aug. 6, 2008 (JP) .................... 2008-203415

(51) Int. Cl.
*F16B 45/00* (2006.01)

(52) U.S. Cl. ............. 248/304; 248/292.12; 248/292.13; 296/37.8

(58) Field of Classification Search ............ 248/294.1, 248/304, 306, 322, 690, 691, 692, 470, 292.12, 248/292.13, 292.14, 215; 24/582.1, 369, 24/716; 220/264, 830, 835; 224/313, 553, 224/560; 185/40 H, 45; 16/64, 354, 289, 16/63, 65, 438, 445; 74/141, 136, 137; 296/37.8
See application file for complete search history.

(56) References Cited

U.S. PATENT DOCUMENTS

| | | | | | |
|---|---|---|---|---|---|
| 4,688,695 | A | * | 8/1987 | Hirohata | 49/364 |
| 5,050,922 | A | * | 9/1991 | Falcoff | 296/37.7 |
| 5,775,761 | A | * | 7/1998 | Asami et al. | 296/37.7 |
| 5,839,548 | A | * | 11/1998 | Parker et al. | 188/82.1 |
| 6,473,936 | B2 | | 11/2002 | Orita | |
| 7,055,883 | B2 | * | 6/2006 | Tokutomi et al. | 296/37.8 |
| 7,328,484 | B2 | * | 2/2008 | Salice | 16/354 |
| 7,661,741 | B2 | * | 2/2010 | Takai | 296/37.1 |
| 8,079,446 | B2 | * | 12/2011 | Nemoto | 185/40 H |
| 2003/0080131 | A1 | * | 5/2003 | Fukuo | 220/264 |
| 2004/0163223 | A1 | | 8/2004 | Bivens et al. | |

FOREIGN PATENT DOCUMENTS

| | | |
|---|---|---|
| DE | 19615433 A1 | 10/1996 |
| JP | H08-287355 A | 11/1996 |
| JP | H08-296685 A | 11/1996 |
| JP | 2001-227237 A | 8/2001 |
| JP | 2002-178818 A | 6/2002 |
| JP | 2006-218941 A | 8/2006 |

* cited by examiner

OTHER PUBLICATIONS

Japan Patent Office, "Office Action for JP 2008-203415", Oct. 9, 2012.

*Primary Examiner* — Terrell McKinnon
*Assistant Examiner* — Eret McNichols
(74) *Attorney, Agent, or Firm* — Manabu Kanesaka

(57) ABSTRACT

An apparatus includes a supporting body, a rotating body assembled with the supporting body and rotating at least between a standard position and a deployed position through an intermediate position, and a biasing device for applying a biasing force to the rotating device in a direction of returning the rotating body to the standard position. A speed switching device changes a rotational speed of the rotating body from the deployed position to the intermediate position different from that from the intermediate position to the standard position in a return rotational movement of the rotating body. The speed switching device includes at least two damping devices; at least two first gears attached to the damping devices for applying damping forces of the damping devices to the rotating body; and at least two second gears formed integrally on the rotating body.

1 Claim, 19 Drawing Sheets

APPARATUS WITH A ROTATING BODY

CROSS-REFERENCE TO RELATED APPLICATIONS

The present application is a divisional application of U.S. Ser. No. 12/285,385 filed on Oct. 3, 2008. The application claims priority to Japanese patent application number 2008-203415 filed on Aug. 6, 2008 and Japanese patent application number 2008-100663 filed on Apr. 8, 2008, which are incorporated by reference in its entirety.

BACKGROUND OF THE INVENTION AND RELATED ART STATEMENT

This invention relates to an improvement of an apparatus with a rotating body, typically, an apparatus that is used as a storage utility, to be installed inside the cabin of an automobile, aircraft, ship, railroad car, or the like.

As a hook apparatus that is provided inside a passenger vehicle, there is one which biases a hook member combined onto a case to be capable of rotation to be drawn into the case by a biasing means, and has a shock-absorbing means which damps the rotation of this hook member into the case. (Patent Document 1: Japanese Unexamined Patent Publication No. 2006-35994). In such apparatus, when the hook member is rotationally operated from inside the case up to a position where an article can be hooked, because the rotation of the hook member into the case is slowed by the shock-absorbing means, it is possible to hook the article on this hook member before the hook member is drawn into the case.

The main subject which this invention attempts to solve is to improve the convenience of use of this kind of apparatus, which has a rotating body such as the hook member of said hook apparatus which is combined onto a supporting body such as the case of said hook apparatus to be capable of rotation, and is constituted so as to bias this rotating body on the side of the deployed position toward the direction of causing return rotation to the standard position.

Further objects and advantages of the invention will be apparent from the following description of the invention.

SUMMARY OF THE INVENTION

In order to accomplish the aforementioned objects, in this invention, according to a first aspect of the invention, the apparatus with a rotating body is made as an apparatus with a rotating body, which is combined onto a supporting body to be capable of rotational movement at least spanning between a standard position and a deployed position, and is constituted such that utilization of the rotating body or the supporting body is enabled in this deployed position. And, it is made such that a biasing force in the direction of causing return rotational movement to the standard position is applied to the rotating body when on the side of the deployed position.

It has a speed switching means which makes difference between the speed of rotational movement from the deployed position to a prescribed intermediate position and the speed of rotational movement from this prescribed intermediate position to the standard position in the return rotational movement of this rotating body.

After the rotating body is rotationally operated up to the deployed position, and when this operation is stopped, the rotating body starts return rotational movement toward the standard position by said biasing force, but the speed of that rotational movement for example can be made slow up to a prescribed intermediate position, and it can be made faster than this from the prescribed intermediate position. By this, while the rotating body is being rotationally moved slowly, it is possible to support something on this rotating body, or to place something inside the supporting body or take something out from the supporting body. It can be made such that when something was placed inside the rotating body as previously mentioned, the rotational return of the rotating body is stopped by this, and when this support is stopped the rotating body is forcefully rotationally returned up to the standard position by said impulsion.

It may also be that said speed switching means is made as one having a gear on the side of a damping means, its rotation being subject to the action of the damping force of the damping means, and a gear on the side of the rotating body which engages with this gear on the side of the damping means, and it is made such that the speed transmission ratio of both gears changes between before and after the return rotational movement of the rotating body reaches the prescribed intermediate position. When it is made as such, it can be made such that the return rotational movement of the rotating body by said impulsion becomes faster up to the prescribed intermediate position, or becomes slower up to the prescribed intermediate position, by such speed switching means.

It may also be that said gear on the side of the rotating body has a large gear part and a small gear part sharing a single axis of rotation at different positions in the axial direction. The gear on the side of the damping means has a large gear part and a small gear part sharing a single axis of rotation at different positions in the axial direction. And, it is made such that before the return rotational movement of the rotating body reaches the prescribed position, the large gear part of the gear on the side of the rotating body engages with the small gear part of the gear on the side of the damping means. After the return rotational movement of the rotating body reaches the prescribed intermediate position, the small gear part of the gear on the side of the rotating body engages with the large gear part of the gear on the side of the damping means.

When it is made as such, before the return rotational movement of the rotating body reaches the prescribed intermediate position, it is made such that the large gear part of the gear on the side of the rotating body engages with the small gear part of the gear on the side of the damping means and the small gear part of the gear on the side of the rotating body does not engage with the large gear part of the gear on the side of the damping means, whereby the rotation of the gear on the side of the rotating body is accelerated and it is transmitted to the gear on the side of the damping means and the damping force of the damping means applied to the rotating body is increased. On the other hand, after the return rotational movement of the rotating body reaches the prescribed intermediate position, it is made such that the small gear part of the gear on the side of the rotating body engages with the large gear part of the gear on the side of the damping means and the large gear part of the gear on the side of the rotating body does not engage with the small gear of the gear on the side of the damping means, whereby the rotation of the gear on the side of the rotating body is decelerated and it is transmitted to the gear on the side of the damping means and the damping force of the damping means applied to the rotating body is decreased. Thus, it can be made such that the return rotational movement of the rotating body becomes slower up to the prescribed intermediate position and becomes faster when passing the prescribed intermediate position.

It may also be that said speed switching means is made as one having one or two or more gears on the side of the damping means, its rotation being subject to the action of the damping force of the damping means, and gears on the side of the rotating body which correspond to and engage with these gears on the side of the damping means. And, it is made such that the number of gears on the side of the rotating body that engage with the gears on the side of the damping means changes between before and after the return rotational movement of the rotating body reaches the prescribed intermediate position, that is, it is made such that what was one up to then becomes zero or is increased or decreased.

Also when it is made as such, it is possible to change the speed of return rotational movement of the rotating body between before and after it reaches the prescribed intermediate position.

It may also be that it has two or more damping means which are linked to the respective gears on the side of the damping means, and it is made such that the rotational movement of the rotating body also is controlled by the gears on the side of the rotating body which correspond respectively to these gears on the side of the damping means, and the damping force of each damping means is made different.

When it is made as such, it is possible to change more markedly the speed of return rotational movement of the rotating body between before and after it reaches the prescribed intermediate position.

Also, in order to accomplish the aforementioned objects, in this invention, according to a second aspect of the invention, the apparatus having a rotating body is made as an apparatus having a rotating body, which is combined onto a supporting body to be capable of rotational movement at least spanning between a standard position and a deployed position, and being constituted such that utilization of the rotating body or the supporting body is enabled in this deployed position. Further, it is made such that a biasing force in the direction of causing return rotational movement to the standard position is applied to the rotating body when not in the standard position. And, it has a speed switching means which makes difference between the speed of rotational movement from the deployed position to a prescribed intermediate position and the speed of rotational movement from this prescribed intermediate position to the standard position in the return rotational movement of this rotating body.

After the rotating body is rotationally operated up to the deployed position, and when this operation is stopped, the rotating body starts return rotational movement toward the standard position by said biasing force, but the speed of that rotational movement for example can be made slow up to a prescribed intermediate position, and it can be made faster than this from the prescribed intermediate position. By this, while the rotating body is being rotationally moved slowly, it is possible to support something on this rotating body, or to place something inside the supporting body or take something out from the supporting body. It can be made such that when something was placed inside the rotating body as previously mentioned, the rotational return of the rotating body is stopped by this, and when this support is stopped the rotating body is forcefully rotationally returned up to the standard position by said impulsion.

If the speed switching means of the apparatus having a rotating body according to the second aspect of the invention is constituted by an auxiliary biasing means which changes the direction of impulsion of this rotating body between before and after the rotational movement of the rotating body reaches the prescribed intermediate position, then it can be made such that the return rotational movement of the rotating body by said impulsion becomes faster up to the prescribed intermediate position, or becomes slower up to the prescribed intermediate position, by such auxiliary biasing means.

Also, if the apparatus having a rotating body according to the second aspect of the invention is given a damping means which applies damping force to the rotational movement of the rotating body, then it is possible to regularly apply damping force to the rotational movement of the rotating body, that is, it is possible to accomplish the return rotational movement of the rotating body from said deployed position to said prescribed intermediate position slowly at one more level.

According to the apparatus pertaining to this invention, it is possible to make difference in the speed of rotational movement of the rotating body before and after a prescribed intermediate position in the return rotational movement from the deployed position to the standard position, and by using this it is possible to hook something on the rotating body, as well as to create space for utilizing the inside of the supporting body, and it is possible to improve the convenience of use of the storage utility.

BRIEF DESCRIPTION OF THE DRAWINGS

FIG. 21 is a graph showing change of biasing forces of springs 43, 44a.

DETAILED DESCRIPTION OF PREFERRED EMBODIMENTS

Figure 1:
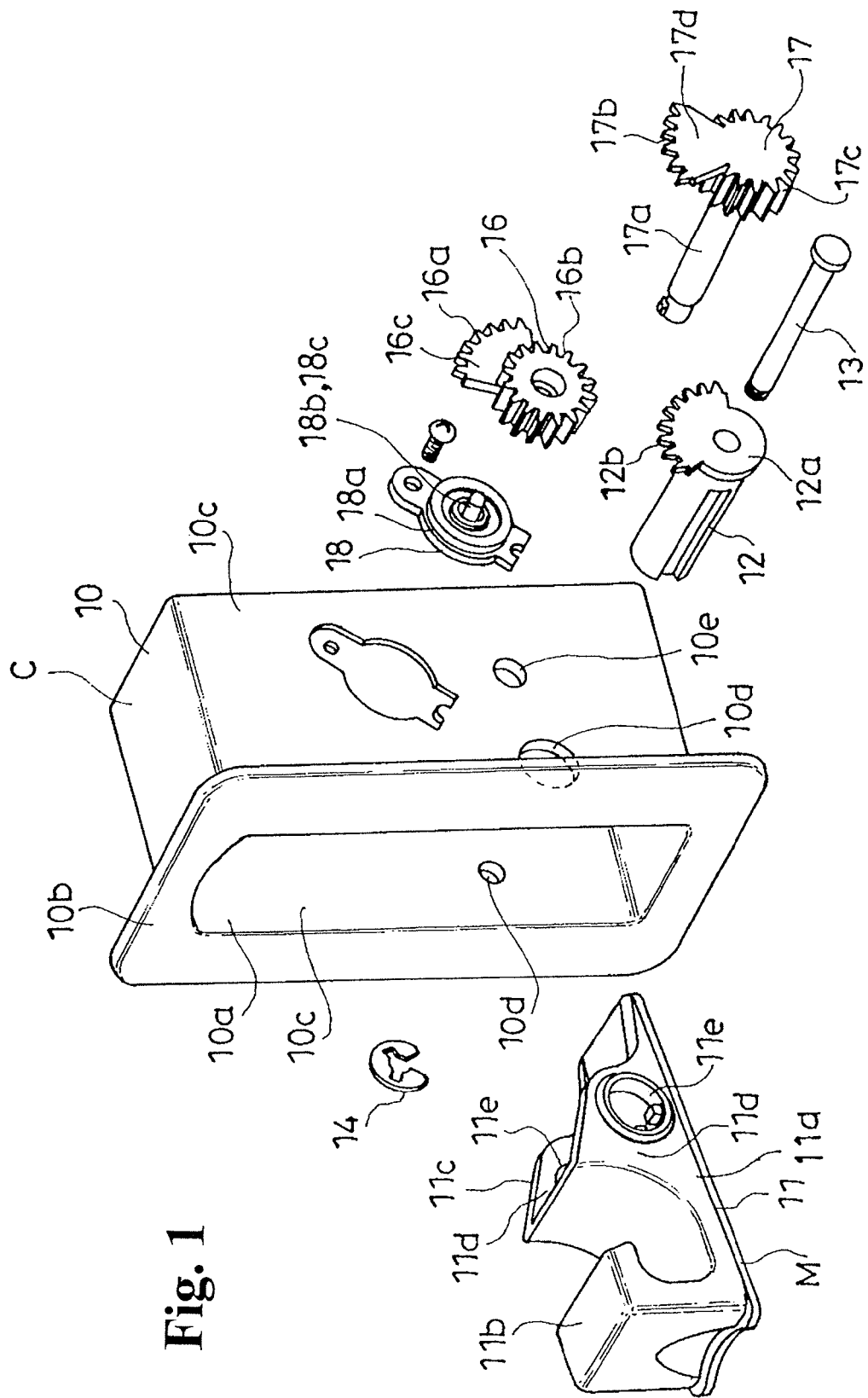
FIG. 1 is an exploded perspective view of the apparatus according to a first embodiment.

Preferred embodiments of the apparatus having a rotating body constituted to be applied to the present invention are explained with reference to FIG. 1 to FIG. 21.

The apparatus according to the embodiments has a rotating body M combined onto a supporting body C to be capable of rotational movement, and it has a biasing means which applies a biasing force on this rotating body M toward a standard position when the rotating body M is in a deployed position or the rotating body M is not in the standard position. In the illustrated examples, such apparatus is used as a storage utility installed inside the cabin of an automobile, aircraft, ship, railroad car, or the like.

Such an apparatus comprises a supporting body C, and a rotating body M which is combined onto this supporting body C to be capable of rotational movement at least spanning between a standard position and a deployed position. Also, it is constituted such that utilization of the rotating body M or the supporting body C is enabled in this deployed position.

Concretely, such apparatus is provided inside the cabin of an automobile, or the like, with the supporting body C for example being fixed to the side of an inner wall inside this cabin. Utilization of the rotating body M in the deployed position is accomplished such as by supporting something with the rotating body M in the deployed position. Also, utilization of the supporting body C in said deployed position is accomplished by placing something inside the supporting body C or taking out something held inside the supporting body C when the rotating body M is in the deployed position. More concretely, for example, when the rotating body M is constituted as a hook body, it is possible to hook an object of hooking on the hook body serving as the rotating body M when in the deployed position and to support this object of hooking with this hook body. Also, for example, when the rotating body M is constituted as a lid body which closes an opening of the supporting body C when in the standard position and opens this opening when in the deployed position, it is possible to place an object of storage inside the supporting body C serving as a storing body, and to take out a placed object of storage, through the opening which is opened in the state when the lid serving as the rotating body M was rotationally moved to the deployed position.

Also, it is made such that a biasing force in the direction of causing return rotational movement to the standard position is applied to the rotating body M when on the side of the deployed position of such apparatus, and such apparatus is provided with a speed switching means which makes difference between the speed of rotational movement from the deployed position to a prescribed intermediate position and the speed of rotational movement from this prescribed intermediate position to the standard position in the return rotational movement of this rotating body M.

After the rotating body M is rotationally operated up to the deployed position, and when this operation is stopped, the rotating body M starts return rotational movement toward the standard position by said biasing force, but the speed of that rotational movement for example can be made slow up to a prescribed intermediate position, and it can be made faster than this from the prescribed intermediate position. By this, while the rotating body M is being rotationally moved slowly, it is possible to support something on this rotating body M, or to place something inside the supporting body C or take something out from the supporting body C. It can be made such that when something was placed inside the rotating body M as previously mentioned, the rotational return of the rotating body M is stopped by this, and when this support is stopped, the rotating body M is forcefully rotationally returned up to the standard position by said impulsion.

(First Embodiment)

Figure 2:
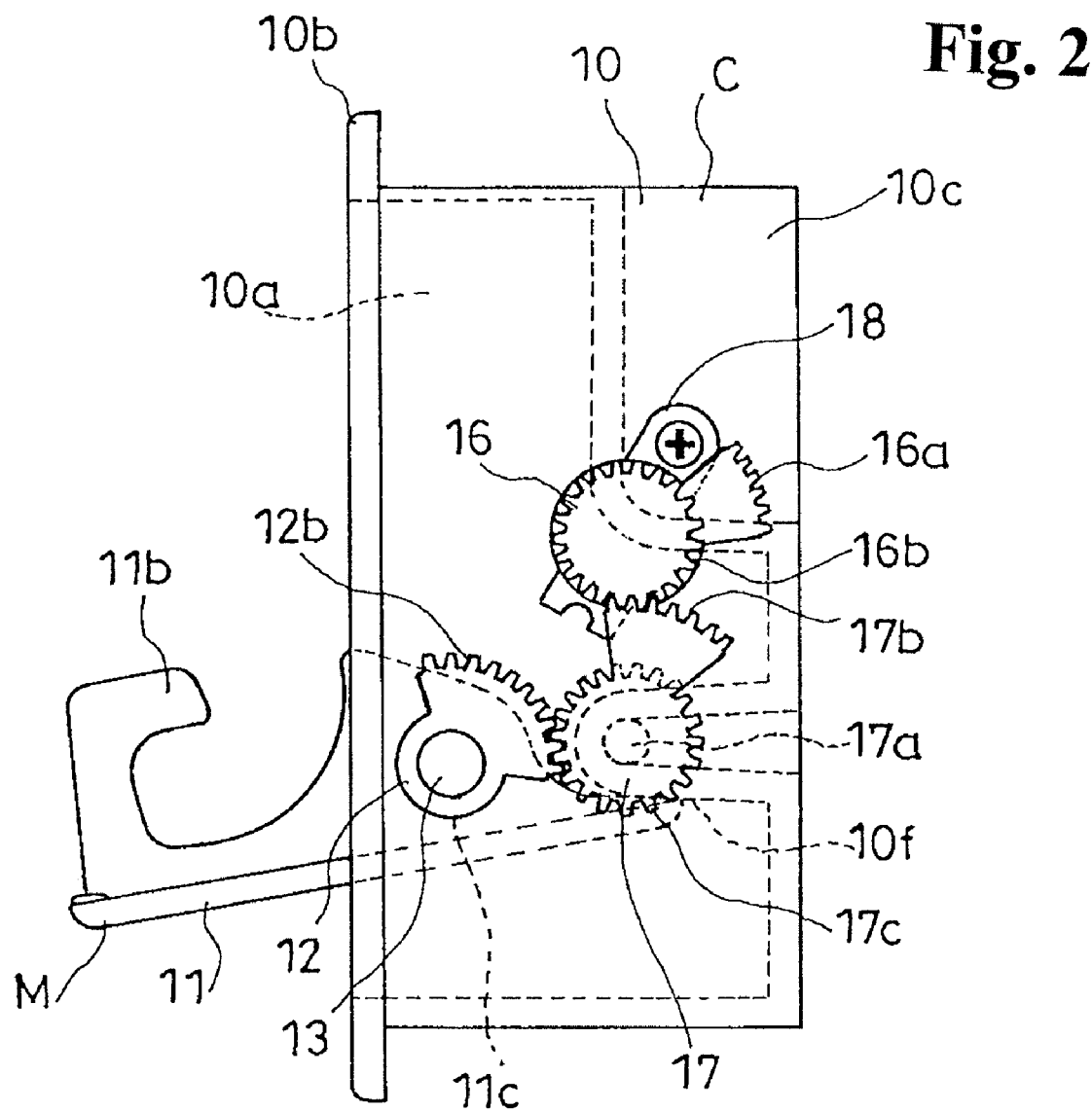
FIG. 2 is a sectional side view thereof showing a state before a return rotational movement of a rotating body reaches a prescribed position.
Figure 3:
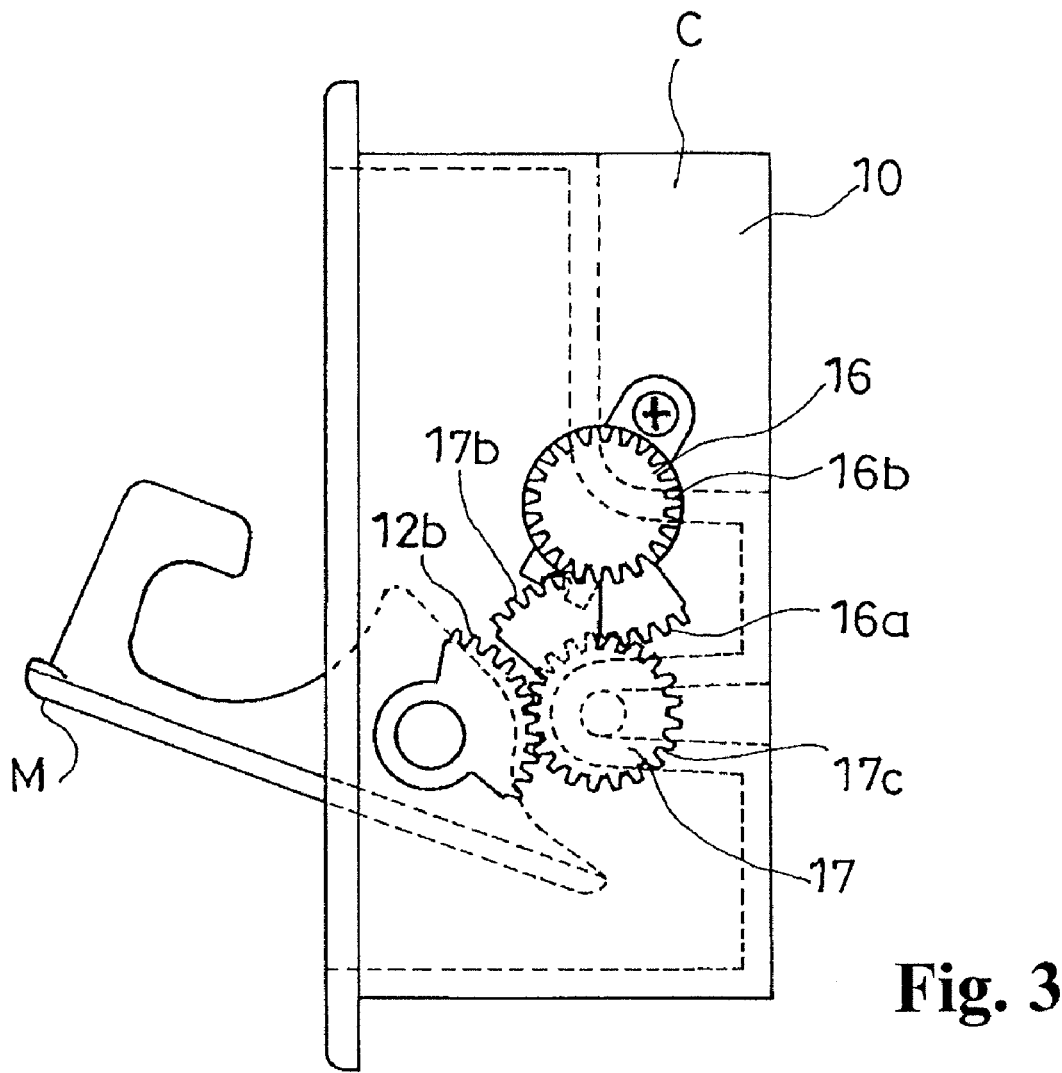
FIG. 3 is a sectional side view thereof showing a state after the return rotational movement of the rotating body reaches the prescribed intermediate position.
Figure 4:
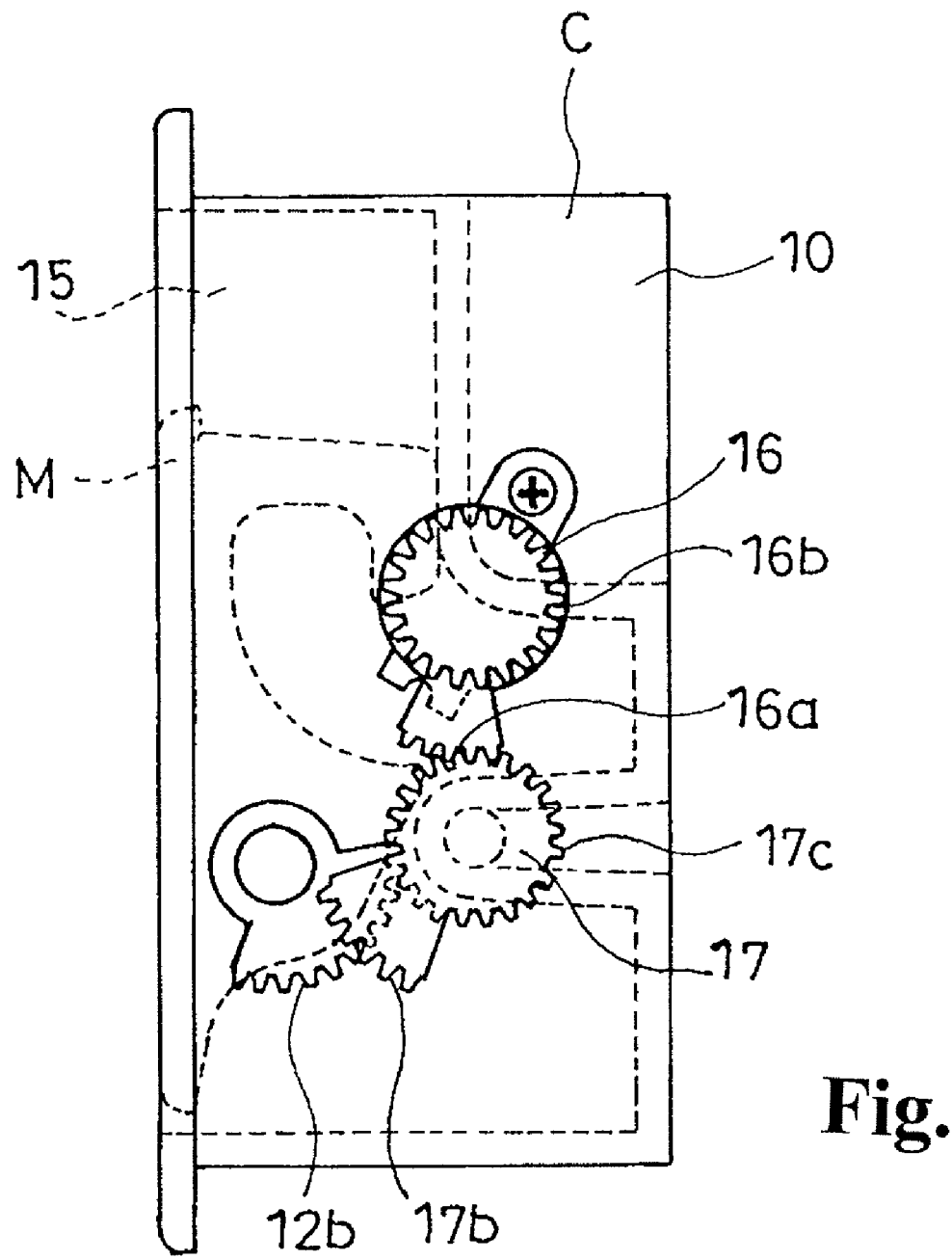
FIG. 4 is a sectional side view thereof showing a state when the rotating body reaches a standard position.

FIG. 1 to FIG. 4 show an example when said rotating body M is made as a hook body 11 and said supporting body C is made as a case body 10 for holding this hook body 11 in the standard position. FIG. 1 shows its constituent parts disassembled, FIG. 2 shows the state when the rotating body M is in the deployed position, FIG. 3 shows the state when the rotating body M was return rotated somewhat from the deployed position toward the standard position by a biasing means 14, which is shown in FIG. 1, and FIG. 4 shows the state when the rotating body M is in the standard position.

In this example, the case body 10 serving as the supporting body C is constituted such that it has a box shape with the front face opened and the open edges of this opening 10a formed in a roughly parallelepiped shape being long in the vertical direction. The case body 10 has an outer flange 10b around that opening, and it is made such that this outer flange 10b is inserted into an attachment hole formed on the inner wall, or the like, inside the cabin of an automobile, or the like (not shown), up to a position where it is hooked in this attachment hole, whereby it is installed in such cabin.

Meanwhile, the hook body 11 serving as the rotating body M has a width about equal to the width of the opening 10a of said case body 10, and it has a plate-shaped base part 11a which is roughly a rectangle shape having a length made shorter than the length of this opening 10a, a hook-shaped part 11b which projects about perpendicularly to one face on one end side of this plate-shaped base part 11a and the projecting end is bent toward the other end side of this plate-shaped base part 11a, and a shaft bearing part 11c which is formed between the one end and the other end on one face of the plate-shaped base part 11a. The shaft bearing part 11c has through-holes 11e respectively on left and right plate parts 11c and 11c. In this example, from a state in which a sleeve body 12 having a head part 12a was passed through a pass-through hole 10d formed on one of the left and right side plates 10c, 10c of the case body 10 and was fitted into the through-hole 11e of the shaft bearing part 11c of the hook body 11, a shaft 13 is passed through this sleeve body 12 from the side of its head part 12a, and an E-ring 14 is fixed to the end part of this shaft 13 projected outward from the pass-through hole 10d on the other of the left and right side plates 10c, 10c of the case body 10, whereby the hook body 11 is assembled onto the case body 10 to be capable of rotational movement centered on this shaft 13.

In the standard position, the plate-shaped base part 11a of the hook body 11 is positioned on about the same plane as the outer flange 10b of the case body 10, the other end of the plate-shaped base part 11a of the hook body 11 is positioned near the lower edge of the open edge of the opening 10a of the case body 10, and the space between one end of the plate-shaped base part 11a of the hook body 11 and the upper edge of the open end of the opening 10a of the case body 10 serves as the open place 15 for operation (FIG. 4). Such hook body 11 is made so as to be positioned in this standard position by a biasing means 14 such as a torsion coil spring. From this standard position, the hook body 11 is made so that it can be turn-down rotated about 90 degrees in opposition to said biasing means 14 by operating one end of the hook body 11 so as to draw it out forward using such open place 15. A restricting part 10f which strikes from underneath the other end of the hook body 11 thus turn-down rotated is formed inside the left and right side plates 10c, 10c of the case body 10 behind the pass-through hole 10d through which the sleeve body 12 was passed.

Also, in this example, the speed switching means has a gear 16 on the side of a damping means, its rotation being subject to the action of the damping force of the damping means 18, and a gear 17 on the side of the rotating body which engages with this gear 16 on the side of the damping means, and it is constituted such that the speed transmission ratio of both gears 16 and 17 is changed between before and after the return rotational movement of this rotating body M reaches the prescribed intermediate position.

In this example, the damping means 18 has a stator body 18a and a rotor body 18b, and it is constituted as a so-called rotary damper so as to apply resistance to the rotation of such rotor body 18b.

The application of such resistance to the rotor body 18b for example can be assured by sealing in a viscous fluid such as silicon oil inside the stator body 18a. The gear 16 on the side of the damping means is provided on the side of the damping means 18 in a manner such that the center of rotation is fixed on the outside end 18c of such rotor body 18b and the axis of rotation is disposed in the left-right direction. In this example, the damping means 18 is provided on the case body 10 by fixing the stator body 18a to the outer face of one of the left and right side plates 10c, 10c of the case body 10.

Meanwhile, the gear 17 on the side of the rotating body is formed in a position directly beneath the rotating shaft of the gear 16 on the side of the damping means, on the end of a shaft body 17a assembled by inserting through shaft holes 10e formed respectively on the left and right side plates 10c, 10c of the case body 10 from the side of one of these left and right side plates 10c, 10c to be capable of rotational movement.

In this example, the gear 17 on the side of the rotating body has a large gear part 17b and a small gear part 17c sharing a single axis of rotation at different positions in the axial direction. The gear 16 on the side of the damping means has a large gear part 16a and a small gear part 16b sharing a single axis of rotation at different positions in the axial direction. And, it is made such that before the return rotational movement of the rotating body M reaches the prescribed position, the large gear part 17b of the gear 17 on the side of the rotating body engages with the small gear part 16b of the gear 16 on the side of the damping means (FIG. 2). After the return rotational movement of the rotating body M reaches the prescribed intermediate position, the small gear part 17c of the gear 17 on the side of the rotating body engages with the large gear part 16a of the gear 16 on the side of the damping means (FIG. 3 to FIG. 4).

Concretely, in this example, the gear 17 on the side of the rotating body is provided with one end of said shaft body 17a integrally continuing on the gear surface. The small gear part 17c has teeth around its entire perimeter. On the other hand, the large gear part 17b is given teeth on an arc-shaped part of a fan-shaped body 17d with the pivot side positioned on the axial side of said shaft body. In this example, a gear part 12b which engages from the front with the small gear 17c of the gear 17 on the side of the rotating body is formed on the head part 12a of said sleeve body 12, and it is made such that the rotational movement of the rotating body M and the rotation of the gear 17 on the side of the rotating body are regularly linked.

Meanwhile, the small gear part 16b of the gear 16 on the side of the damping means has teeth around its entire perimeter, and the large gear part 16a is given teeth on an arc-shaped part of a fan-shaped body 16c with the pivot side positioned on the side of the center of rotation of said rotor body 18b.

By such speed switching means, it is possible to make it such that the return rotational movement of the rotating body M by said impulsion becomes faster up to the prescribed intermediate position or becomes slower up to the prescribed intermediate position.

In this example, in particular, before the return rotational movement of the rotating body M reaches the prescribed intermediate position, it is made such that the large gear part 17b of the gear 17 on the side of the rotating body is made to engage with the small gear part 16b of the gear 16 on the side of the damping means and the small gear part 17c of the gear 17 on the side of the rotating body is not made to engage with the large gear part 16a of the gear 16 on the side of the damping means, whereby the rotation of the gear on the side of the rotating body is accelerated and it is transmitted to the gear 16 on the side of the damping means and the damping force of the damping means 18 applied to the rotating body M is increased. On the other hand, after the return rotational movement of the rotating body M reaches the prescribed intermediate position, it is made such that the small gear part 17c of the gear 17 on the side of the rotating body is made to engage with the large gear part 16a of the gear 16 on the side of the damping means and the large gear part 17b of the gear 17 on the side of the rotating body is not made to engage with the small gear 16b of the gear 16 on the side of the damping means, whereby the rotation of the gear on the side of the rotating body is decelerated and it is transmitted to the gear 16 on the side of the damping means and the damping force of the damping means 18 applied to the rotating body M is decreased. That is, in this example, it is made such that the return rotational movement of the rotating body M becomes slower up to the prescribed intermediate position and becomes faster when passing the prescribed intermediate position.

(Second Embodiment)

Figure 5:
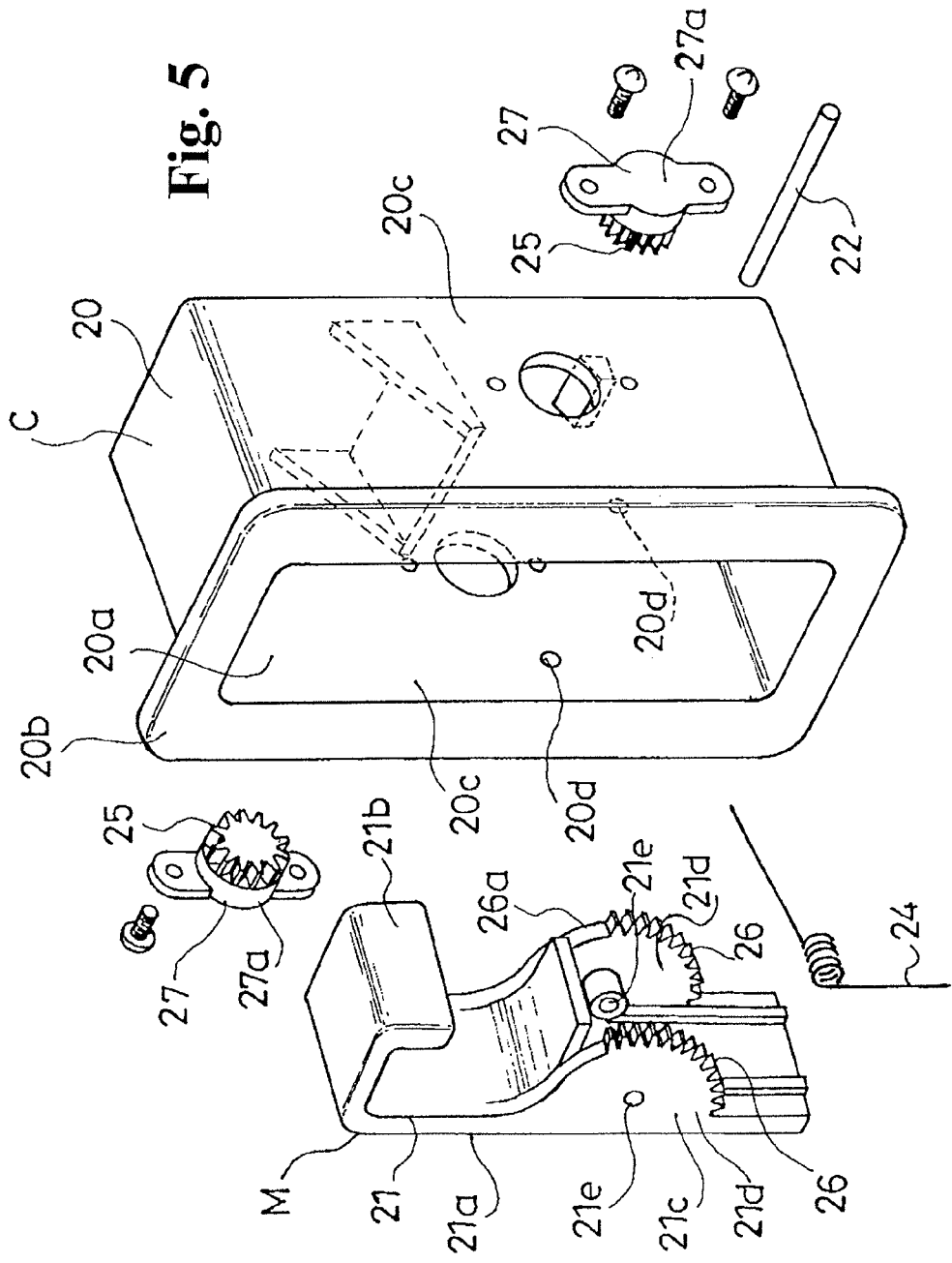
FIG. 5 is an exploded perspective view of the apparatus according to a second embodiment.
Figure 6:
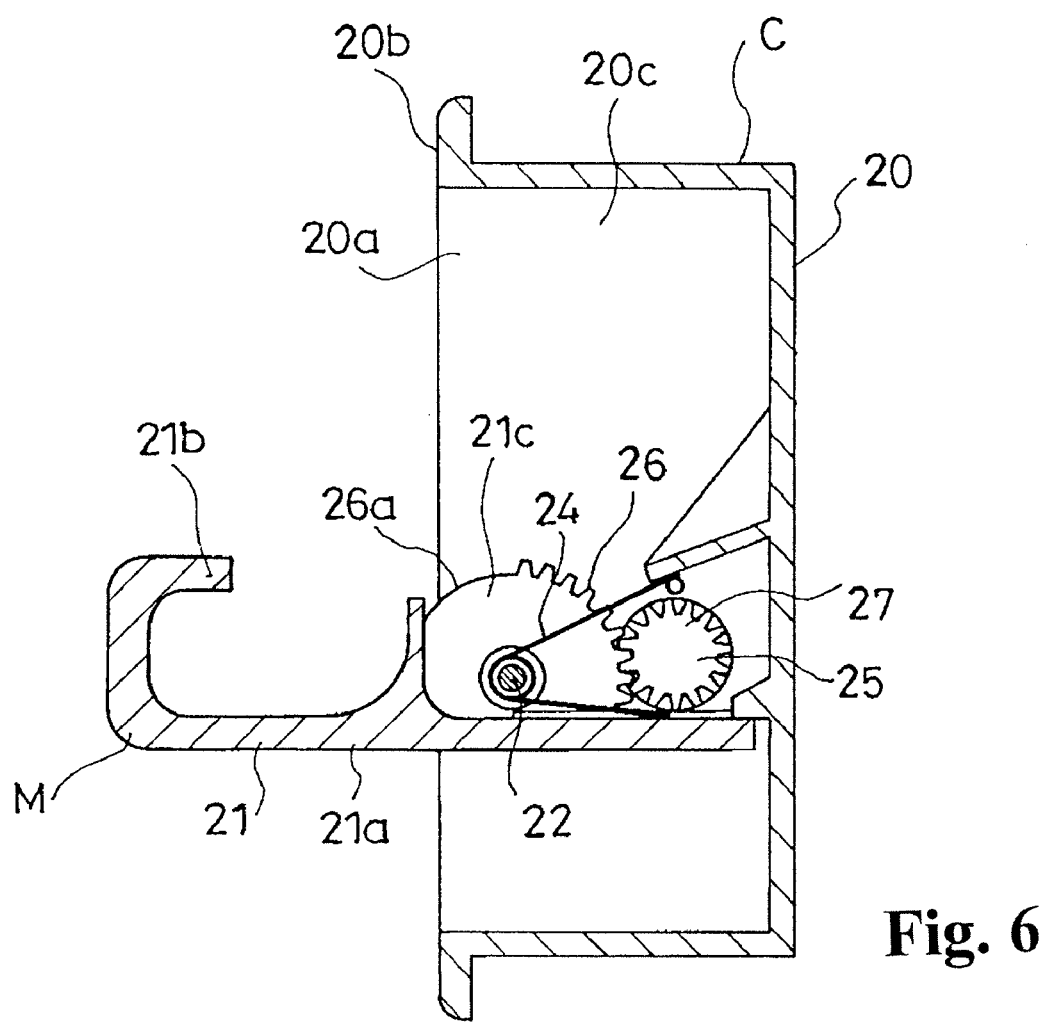
FIG. 6 is a sectional side view thereof according to the second embodiment showing a state when the rotating body is in a deployed position.
Figure 8:
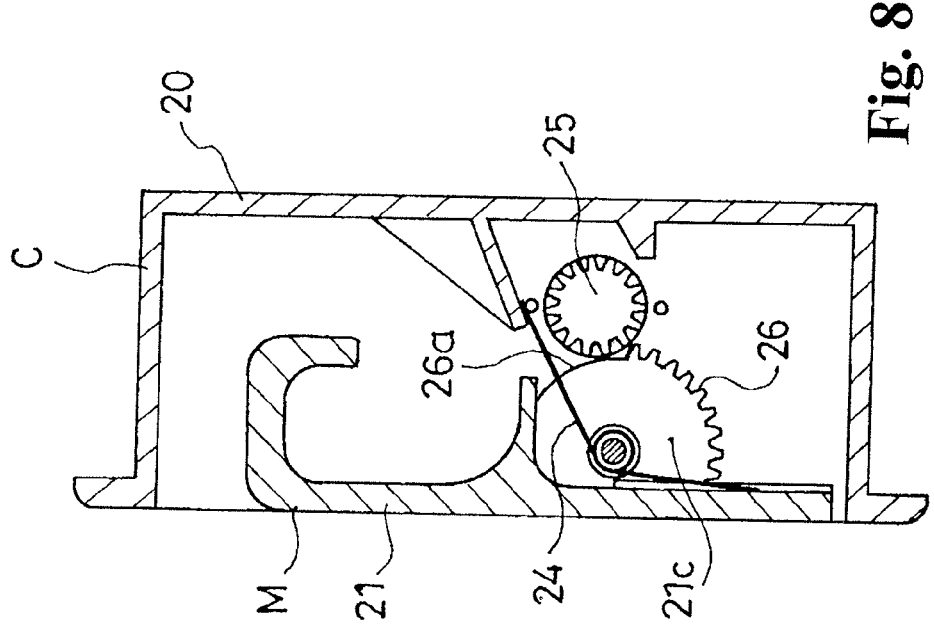
FIG. 8 is an another sectional side view thereof according to the second embodiment showing a state when the rotating body is in a standard position.
Figure 7:
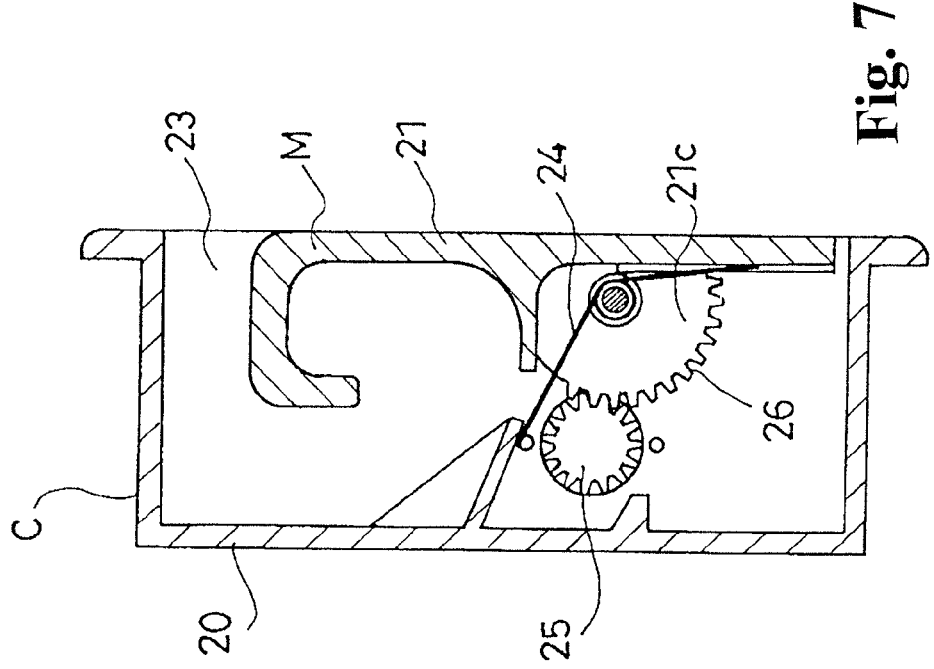
FIG. 7 is a sectional side view thereof according to the second embodiment showing a state when the rotating body is in a standard position.

FIG. 5 to FIG. 8 show an example when said rotating body M is made as a hook body 21 and said supporting body C is made as a case body 20 for holding this hook body 21 in the standard position. FIG. 5 shows its constituent parts disassembled, FIG. 6 shows the state when the rotating body M is in the deployed position, and FIG. 7 and FIG. 8 show the state when the rotating body M is in the standard position. FIG. 7 shows the state of engagement between the gear 26 on the side of the rotating body on the left side in FIG. 5 and the gear 25 on the side of the damping means on this side, and FIG. 8 shows the state of engagement between the gear 26 on the side of the rotating body having a toothless part 26a on the right side in FIG. 5 and the gear 25 on the side of the damping means on this side.

In this example also, the case body 20 serving as the supporting body C is constituted such that it has a box shape with the front face opened and the open edges of this opening 20a formed in a roughly rectangle shape being long in the vertical direction. The case body 20 has an outer flange 20b around that opening 20a, and it is made such that this outer flange 20b is inserted into an attachment hole formed on the inner wall, or the like, inside the cabin of an automobile, or the like (not shown), up to a position where it is hooked in this attachment hole, whereby it is installed in such cabin.

Meanwhile, the hook body 21 serving as the rotating body M has a width about equal to the width of the opening 20a of said case body 20, and it has a plate-shaped base part 21a which is roughly rectangle shaped having a length made shorter than the length of this opening 20a, a hook-shaped part 21b which projects about perpendicularly to one face on one end side of this plate-shaped base part 21a and the projecting end is bent toward the other end side of this plate-shaped base part 21a, and a shaft bearing part 21c which is formed between the one end and the other end on one face of the plate-shaped base part 21a. The shaft bearing part 21c has through-holes 21e respectively on left and right plate parts 21d, 21d. In this example, a shaft 22 is passed through passthrough holes 20d formed on the left and right side plates 20c, 20c of the case body 20 into the through-holes 21e of the shaft bearing part 21c of the hook body 21, whereby the hook body 21 is assembled onto the case body 20 to be capable of rotational movement centered on this shaft 22.

In the standard position, the plate-shaped base part 21a of the hook body 21 is positioned on about the same plane as the outer flange 20b of the case body 20, the other end of the plate-shaped base part 21a of the hook body 21 is positioned near the lower edge of the open edge of the opening 20a of the case body 20, and the space between one end of the plate-shaped base part 21a of the hook body 21 and the upper edge of the open end of the opening 20a of the case body 20 serves as the open place 23 for operation (FIG. 8). Such-hook body 21 is made so as to be positioned in this standard position by a torsion coil spring 24 serving as the biasing means which is coiled around said shaft 22 and has one end of the spring fixed to the side of the hook body 21 and the other end of the spring fixed to the side of the case body 20. From this standard position, the hook body 21 is made so that it can be turn-down rotated about 90 degrees in opposition to said biasing means by operating one end of the hook body 21 so as to draw it out forward using such open place 23.

Also, in this example, the speed switching means has two gears 25, 25 on the side of the damping means, its rotation being subject to the action of the damping force of the damping means 27, and gears 26 on the side of the rotating body which correspond to and engage with these gears 25 on the side of the damping means. Further, it is made such that the number of gears 26 on the side of the rotating body that engage with the gears 25 on the side of the damping means changes (increases or decreases) between before and after the return rotational movement of the rotating body M reaches the prescribed intermediate position.

By this, in this example, it is made such that the speed of the return rotational movement of the rotating body M can be changed between before and after reaching the prescribed intermediate position.

Also, in this example, two damping means 27 linked respectively to the gears 25 on the side of the damping means are provided, and it is made such that the rotational movement of the rotating body M also is controlled by the gears 26 on the side of the rotating body which correspond respectively to these gears 25 on the side of the damping means, and also the damping force of each damping means 27 and 27 is made different.

By this, in this example, it is made such that the speed of the return rotational movement of the rotating body M can be changed more markedly between before and after reaching the prescribed intermediate position.

Concretely, in this example, it is constituted such that the respective left and right plate parts 21d, 21d constituting the shaft bearing part 21c of the hook body 21 have a semicircular plate shape following the arc of an imaginary circle centered on said through-hole 21e. In addition to that, one of such left and right plate parts 21d, 21d is made as a gear 26 on the side of the rotating body having teeth around the entirety of the edge of that plate (FIG. 7), and the other of such left and right plate parts 21d, 21d is made as a gear 26 on the side of the rotating body having a toothless part 26a with teeth only in a place on the edge of that plate being positioned below when the hook body 21 is in the standard position (FIG. 8).

Meanwhile, in this example, the two damping means 27 each have a stator body 27a and a rotor body (not shown), and it is constituted as a so-called rotary damper so as to apply resistance to the rotation of such rotor body. The application of such resistance to the rotor body for example can be assured by sealing in a viscous fluid such as silicon oil inside the stator body 27a. The gear 25 on the side of the damping means is provided on the side of the damping means 27 with the center of rotation fixed on the outside end of such rotor body.

In this example, one of the damping means 27 is provided on the case body 20 with the stator body 27a fixed to one of the left and right side plates 20c, 20c of the case body 20, and the other of the damping means 27 is provided on the case body 20 with the stator body 27a fixed to the other of the left and right side plates 20c, 20c of the case body 20, behind the place of assembly for rotational movement of the hook body 21 on the case body 20.

In addition to that, it is made such that the damping force of one of the damping means 27 is stronger than the damping force of the other, and moreover that the gear 26 on the side of the rotating body having the toothless part 26a of the hook body 21 engages with the gear 25 on the side of the damping means provided on the damping means 27 having strong damping force during the period from the deployed position to the intermediate position, while the other gear on the rotating side regularly engages with the gear 25 on the side of the damping means provided on the damping means 27 having weak damping force.

By this, in this example, before the return rotational movement of the rotating body M reaches the prescribed intermediate position, the return rotational movement of the rotating body M is made slower by applying the damping forces of the two damping means 27, 27 simultaneously to the rotating body M, on the other hand, after the return rotational movement of the rotating body M reaches the prescribed intermediate position, the return rotational movement of the rotating body M is made faster by applying only the damping force of the damping means 27 having weak damping force to the rotating body M.

(Third Embodiment)

Figure 9:
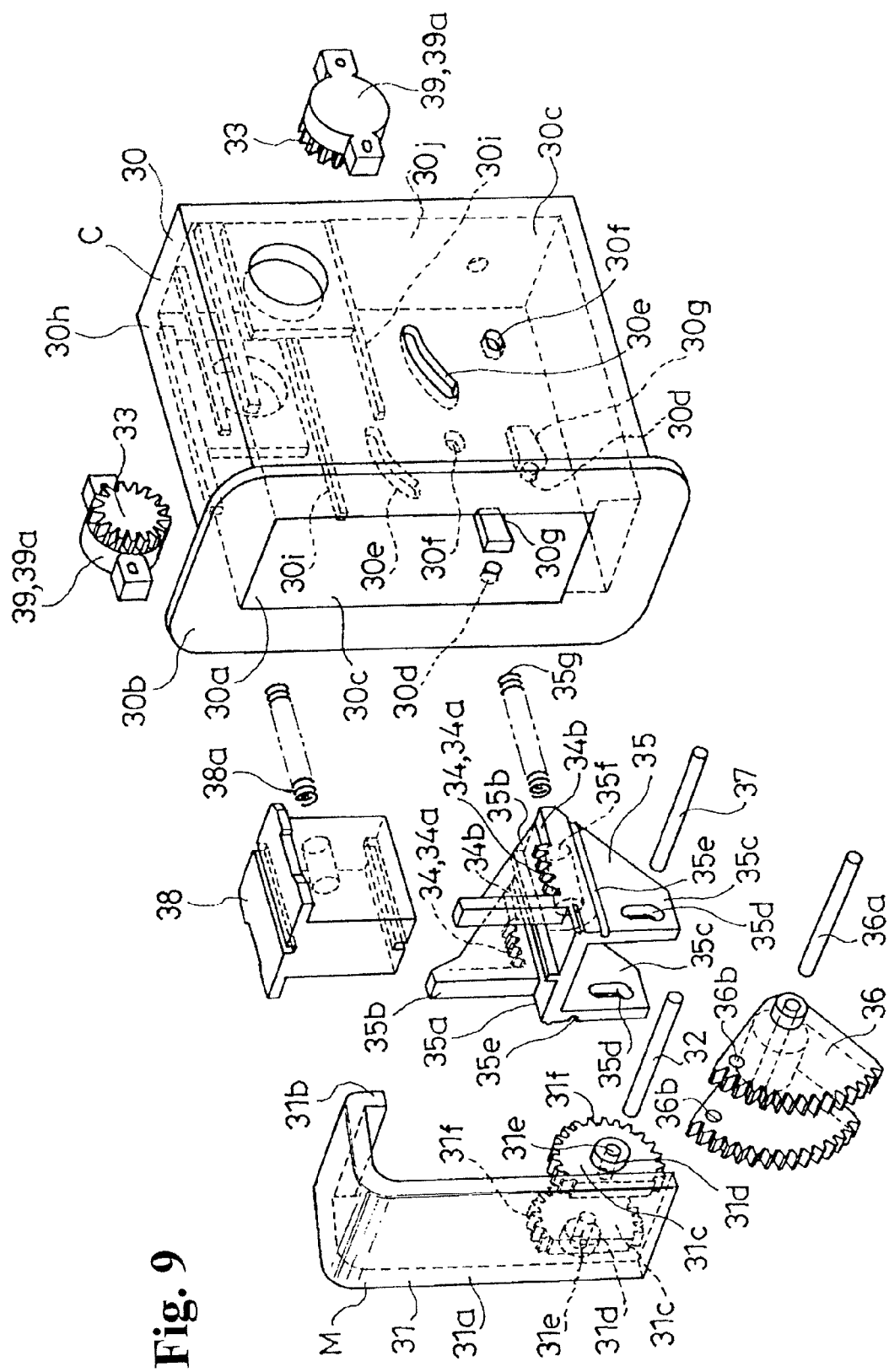
FIG. 9 is an exploded perspective view of an apparatus according to a third embodiment.
Figure 10:
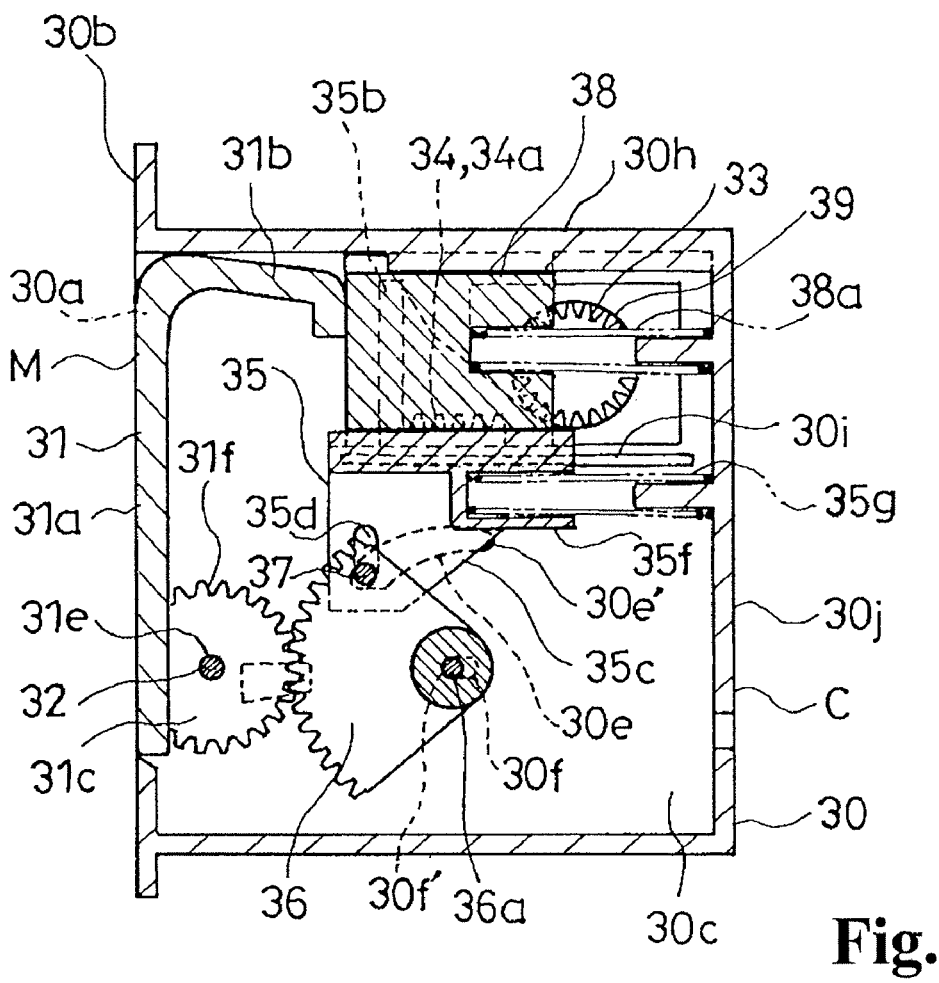
FIG. 10 is a sectional side view thereof according to the third embodiment showing a state when the rotating body is in the standard position.
Figure 11:
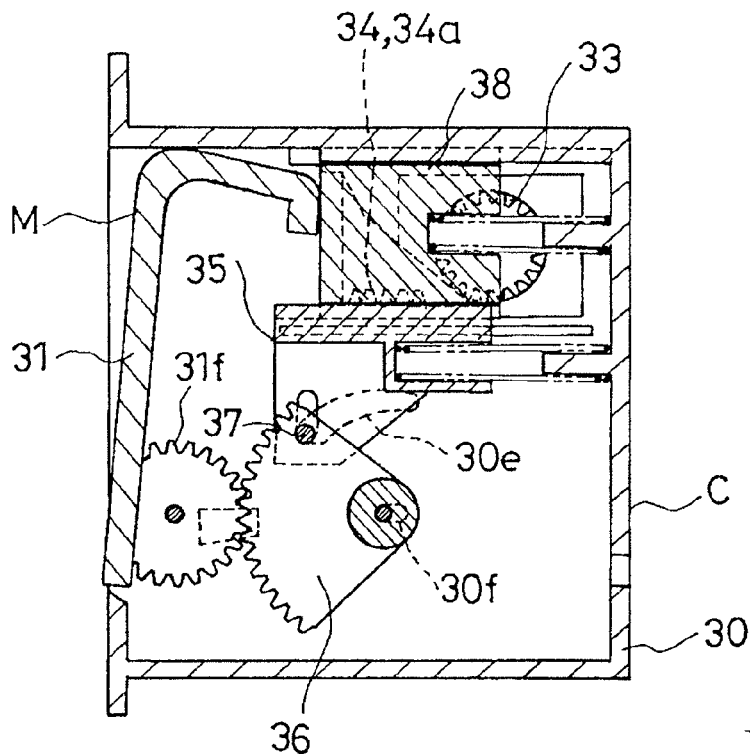
FIG. 11 is a sectional side view thereof according to the third embodiment showing a state when an auxiliary slider is moved backward.
Figure 12:
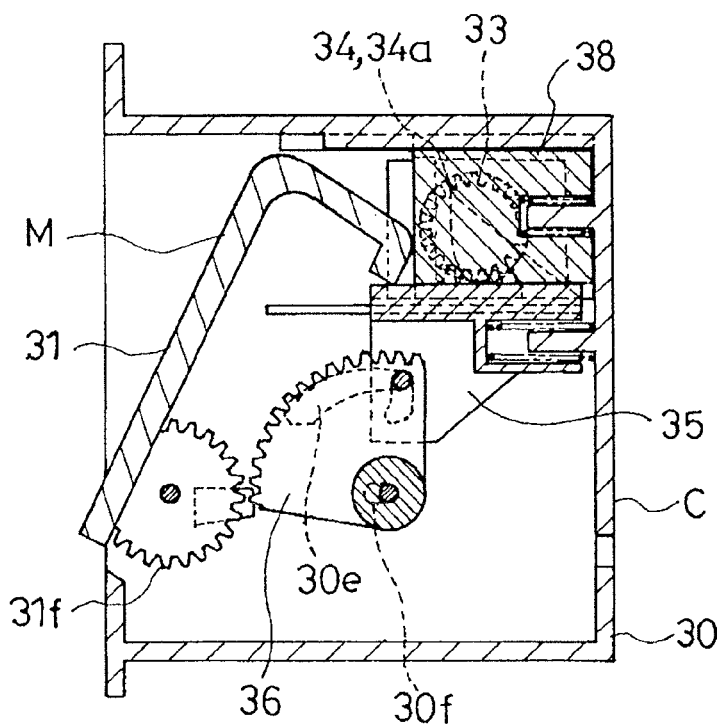
FIG. 12 is a sectional side view thereof according to the third embodiment showing a state when a slider is moved backward by further pushing.
Figure 13:
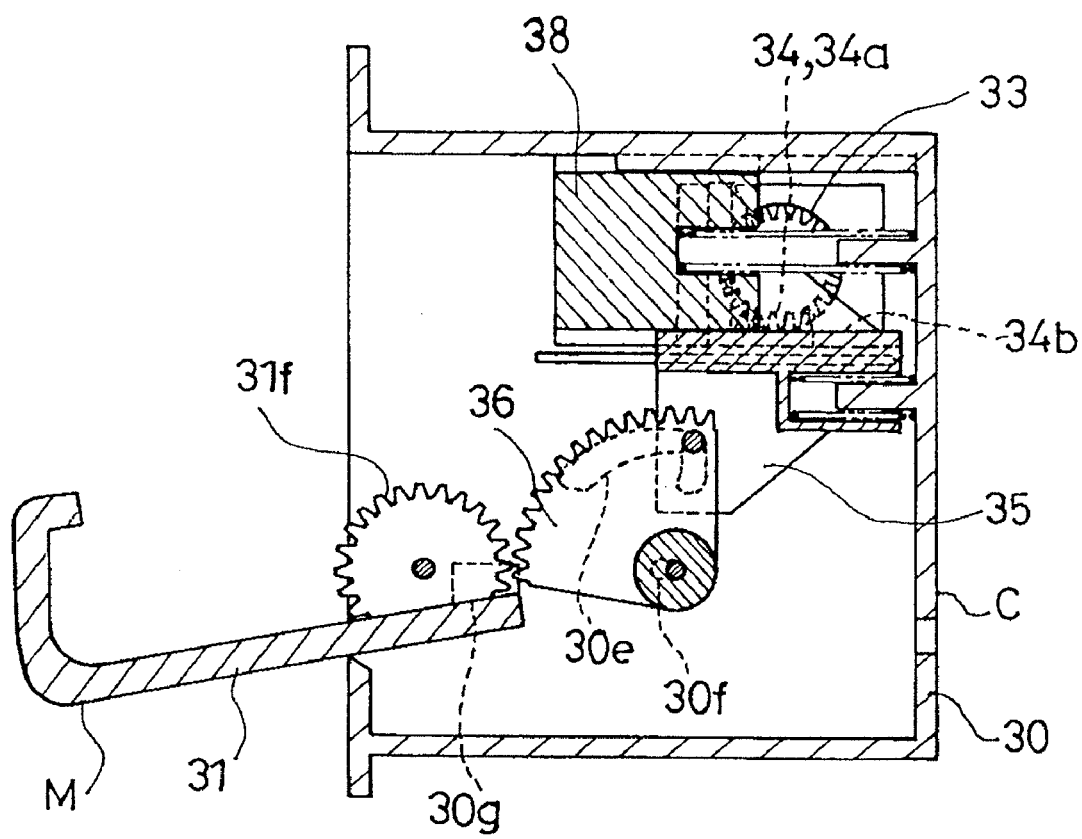
FIG. 13 is a sectional side view thereof according to the third embodiment showing a state immediately after stopping the pushing in from the state in FIG. 12.
Figure 14:
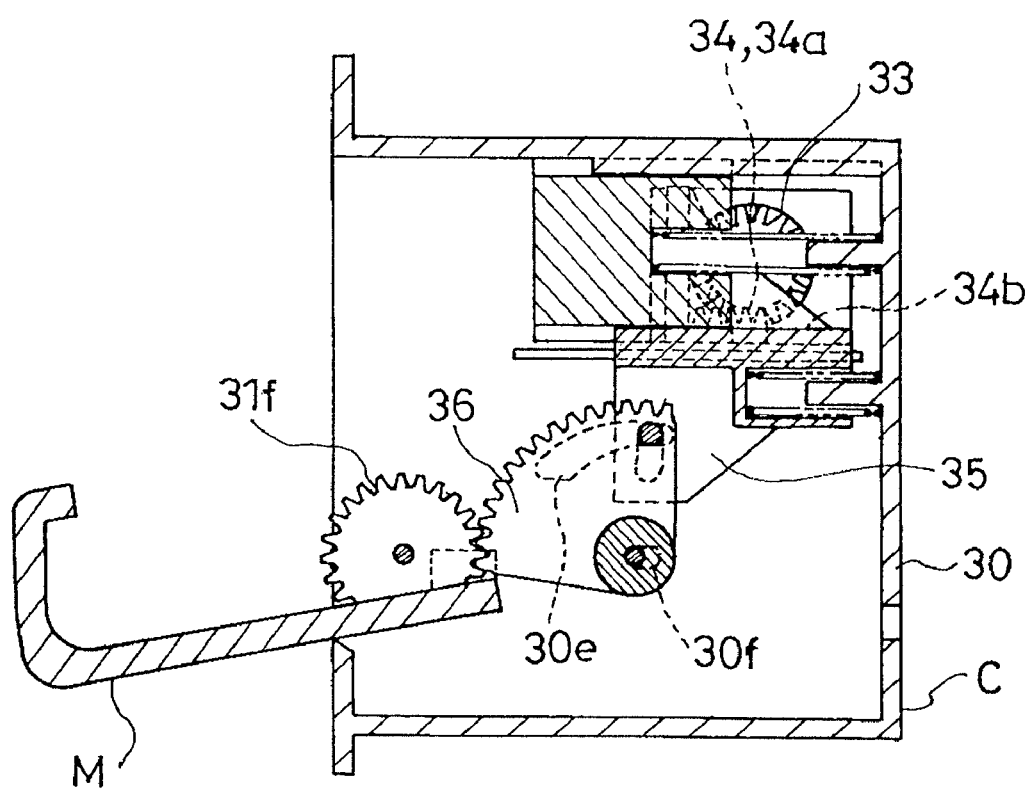
FIG. 14 is a sectional side view thereof according to the third embodiment showing a state when the slider is moved forward by the bias force of a bias means from the state in FIG. 13.

FIG. 9 to FIG. 14 show an example when said rotating body M is made as a hook body 31 and said supporting body C is made as a case body 30 for holding this hook body 31 in the standard position. FIG. 9 shows its constituent parts disassembled, FIG. 10 shows the state when the rotating body M is in the standard position, FIG. 11 shows the state when an auxiliary slider 38 was moved backward by pushing in backward the upper side of the rotating body M from the state in FIG. 10, FIG. 12 shows the state when a slider 35 was moved backward by further pushing in backward the upper side of the rotating body M from the state in FIG. 11, FIG. 13 shows the state immediately after stopping this pushing in from the state in FIG. 12, and FIG. 14 shows the state when the slider 35 was moved forward by the impulsion of the biasing means from the state in FIG. 13 whereby a linkage gear 36 and a gear-shaped body 31f of the hook body 31 are again engaged.

In this example also, the case body 30 serving as the supporting body C is constituted such that it has a box shape with the front face opened and the open edges of this opening 30a formed in a roughly rectangle shape being long in the vertical direction. The case body 30 has an outer flange 30b around that opening 30a, and it is made such that this outer flange 30b is inserted into an attachment hole formed on the inner wall, or the like, inside the cabin of an automobile, or the like (not shown), up to a position where it is hooked in this attachment hole, whereby it is installed in such cabin.

Meanwhile, the hook body 31 serving as the rotating body M has a plate-shaped base part 31a which is roughly rectangle shaped having a width and length about equal to the width of the opening 30a of said case body 30, a hook-shaped part 31b which projects about perpendicularly to one face on one end side of this plate-shaped base part 31a and the projecting end is bent toward the other end side of this plate-shaped base part 31a, and a shaft bearing part 31c which is formed between the one end and the other end on one face of the plate-shaped base part 31a. The shaft bearing part 31c has through-holes 31e respectively on left and right plate parts 31d, 31d. In this example, a shaft 32 is passed through pass-through holes 30d formed on the left and right side plates 30c, 30c of the case body 30 into the through-holes 31e of the shaft bearing part 31c of the hook body 31, whereby the hook body 31 is assembled onto the case body 30 to be capable of rotational movement centered on this shaft 32. In the standard position, the plate-shaped base part 31a of the hook body 31 is positioned on about the same plane as the outer flange 30b of the case body 30, and it is made so as to close the opening 30a of the case body 30 (FIG. 10). Meanwhile, the hook body 31 is made so as to be turn-down rotated about 90 degrees forward from this standard position to be positioned in the deployed position (FIG. 13). A restricting part 30g which strikes from underneath the other end of the hook body 31 thus turn-down rotated is formed inside the left and right side plates 30c, 30c of the case body 30 and behind the pass-through hole 30d through which said shaft 32 was passed.

Also, in this example, the speed switching means has two gears 33, 33 on the side of the damping means, its rotation being subject to the action of the damping force of the damping means 39, and gears 34 on the side of the rotating body which correspond to and engage with these gears 33 on the side of the damping means. Further, it is made such that the number of gears 34 on the side of the rotating body that engage with the gears 33 on the side of the damping means changes between before and after the return rotational movement of the rotating body M reaches the prescribed intermediate position.

By this, in this example, it is made such that the speed of the return rotational movement of the rotating body M can be changed between before and after reaching the prescribed intermediate position.

In this example, the gear 34 on the side of the rotating body is constituted by a rack 34a formed on a slider 35 to be described later, also, it is made such that before the return rotational movement of the rotating body M reaches the prescribed intermediate position, said rack 34a engages with each of the two gears 33, 33 on the side of the damping means, but after reaching the prescribed intermediate position, neither rack 34a engages with a gear of the damping means 39, and after the return rotational movement of the rotating body M reaches the prescribed intermediate position, the number of gears 34 on the side of the rotating body that engage with the gears 33 on the side of the damping means becomes zero.

In this example, it is made such that the operation of the hook body 31 serving as the rotating body M is controlled by a slider 35 which is supported on the case body 30 to be capable of sliding movement in the forward-backward direction, a linkage gear 36 which is rotationally moved in linkage with the forward-backward movement of this slider 35, and a compression coil spring 35g serving as a biasing means which biases this slider 35 forward.

The slider 35 has a plate-shaped base 35a, upper side plates 35b which project upward respectively from the left and right sides of this base 35a, and lower side plates 35c which project downward respectively from the left and right sides of this base 35a. On the left and right sides of the slider 35, there is respectively formed a slot 35e which extends along the forward-backward direction, meanwhile, on the inner faces of the left and right side plates 30c, 30c of the case body 30, there is respectively formed a rail part 30i which extends along the forward-backward direction opening a gap for receiving the upper side of the slider 35 between it and the ceiling plate of the case body 30, and the slider 35 receives this rail part 30i in its slot 35e and is received to be capable of forward-backward movement on the upper side of the case body 30. On the lower side of the base 35a of this slider 35, there is formed a spring receiving part 35f which receives and supports the front end of a compression coil spring 35g, the rear end of the spring being supported on a back plate 30j of the case body 30, and it is made such that the slider 35 is regularly subject to forward biasing force by this spring 35g.

The linkage gear 36 has a fan-shaped plate shape, and teeth are provided on its arc-shaped part, and it is combined onto the case body 30 to be capable of rotational movement behind the part of assembly for rotational movement of the hook body 31 using a shaft 36a with the axial line made to follow the left-right direction in the pivot part. The linkage gear 36 is provided respectively on the left and the right. The left and right plate parts 31d, 31d of the shaft bearing part 31c of the hook body 31 respectively serve as gear-shaped bodies 31f having teeth on the edges of those plates. Also, in this example, it is made such that the gear-shaped body 31f on the right side of the hook body 31 is coupled to the linkage gear 36 on the right side, and the gear-shaped body 31f on the left side of the hook body 31 is coupled to the linkage gear 36 on the left side. Also, it is made such that the upper sides of the left and right linkage gears 36 are taken between the left and right lower side plates 35c of the slider 35. Pass-through holes 36b are formed respectively on the upper end sides of the left and right linkage gears 36, and long holes 35d which extend long in the up-down direction are formed on the front end sides of the lower side plates 35c of the slider 35, and the slider 35 and the linkage gears 36 are linked by passing a shaft 37 through the pass-through holes 36b of the left and right linkage gears 36 and the long holes 35d of the lower side plates 35c of the slider 35. The ends of this shaft 37 are received in through-slots 30e formed on the left and right sides 30c, 30c of the case body 30 so as to follow the arc of a circle centered on the shaft of the linkage gear 36.

In this example, the turn-down rotation of the hook body 31 toward the deployed position when in the standard position is made so as to cause backward movement of the slider 35 in opposition to the impulsion of said biasing means by means of the linkage gear 36, whereby such turn-down rotation is stopped, and the state of the hook body 31 in this standard position is kept stable (FIG. 10). At this time, said shaft 37 is at the front end of the through-slot 30e and further forward movement of the slider 35 is stopped.

In this example, a block-shaped auxiliary slider 38 furthermore is supported to be capable of forward-backward movement on the slider 35 between the left and right upper side plates 35b. This auxiliary slider 38 also is regularly biased forward by a compression coil spring 38a serving as an auxiliary biasing means, and when the hook body 31 is in the standard position, it projects further forward than the front end of the upper side plates 35*b* of the slider 35 and strikes the hook-shaped part 31*b* of the hook body 31 in this standard position (FIG. 10), but the biasing force of this auxiliary slider 38 is smaller than the biasing force of the slider 35, and the auxiliary slider 38 does not impede the state of the hook body 31 in the standard position.

When the upper end side of the hook body 31 in the standard position is pushed in backward, first the hook-shaped part 31*b* is pushed against the front end of the auxiliary slider 38 and it is pushed in backward in opposition to the impulsion (FIG. 11), and next, this hook-shaped part 31*b* is pushed against the front end of the upper side plates 35*b* of the slider and the slider 35 is pushed in backward in opposition to the impulsion (release operation/FIG. 12). In the illustrated example, it is made such that in the standard position the shaft 37 of the linkage gear 36 is positioned on the lower end side of the long hole 35*d* of the slider 35, and by said release operation the gear-shaped body 31*f* is rotated in the clockwise direction in FIG. 10 and the linkage gear 36 engaged with this is rotated in the counterclockwise direction in FIG. 10, but on the lower end side of the long hole 35*d* of the slider 35 there is created a space for letting the shaft 37 slip in the direction of rotation of the linkage gear 36 at this time, whereby said counterclockwise rotation of the linkage gear 36 before the start of backward movement of the slider 35 is allowed. Also, because the backward movement of the slider 35 causes rotation of the linkage gear 36 in the clockwise direction in FIG. 11, at this time the need to release the engagement between the gear-shaped body 31*f* and the linkage gear 36 arises. In the illustrated example, said through-slot 30*e* is constituted such that the slot width is made wider going from its ear end 30*e*' to its front end, whereby simultaneously with the pushing-in of the slider 35, the shaft 36*a* of the linkage gear 36 is moved from the front end 30*f* of the shaft hole 30*f* to the rear end and the engagement between the gear-shaped body 31*f* and the linkage gear 36 is released, allowing said backward movement of the slider 35. In this example, when the slider 35 is moved backward as previously mentioned, it is made such that a rack 34*a* to be described later of the slider 35 and the gear 33 on the side of the damping means engage. By this engagement, the slider 35 is not immediately moved forward by the impulsion even though the pushing-in of the hook body 31 is stopped, therefore when the pushing-in of the hook body 31 is stopped the front end side of the hook body 31 is pushed forward by the auxiliary slider 38 which is moved forward by the impulsion, the hook body 31 passes the standard position and further passes the prescribed intermediate position and is turn-down rotated up to the deployed position (FIG. 13). From this state, when the slider 35 is moved forward up to the position where the shaft 36*a* of the linkage gear 36 is positioned at the front end of the shaft hole 30*f*, the linkage gear 36 and the gear-shaped body 31*f* of the hook body 31 are again engaged (FIG. 14), and the hook body 31 in the deployed position is further turn-down rotated toward the standard position by the slider 35 which is moved forward by the impulsion.

In this example, a rack 34*a* serving as the gear 34 on the side of the rotating body having teeth on the upper part is formed so as to continue along the front-back direction respectively on each outside of the left and right upper side plates 35*b*, being base parts of the upper side plates 35*b* of the slider 35.

Meanwhile, in this example, two damping means 39, 39 have a stator body 39*a* and a rotor body not illustrated, and they are constituted as so-called rotary dampers constituted so as to apply resistance to the rotation of such rotor bodies. The application of such resistance to the rotor body for example can be assured by sealing in a viscous fluid such as silicon oil inside the stator body. The gear 33 on the side of the damping means is provided on the side of the damping means 39 with the center of rotation fixed on the outside end of such rotor body.

In this example, one of the damping means 39 is provided on the case body 30 with the stator body 39*a* fixed on one of the left and right side plates 30*c*, 30*c* of the case body 30 such that the gear 33 on the side of the damping means is positioned inside the case body 30, and the other of the damping means 39 is provided on the case body 30 with the stator body 39*a* fixed on the other of the left and right side plates 30*c*, 30*c* of the case body 30 such that the gear 33 on the side of the damping means is positioned inside the case body 30. Also, it is made such that the rack 34*a* on the right side of the slider 35 engages with the lower end of the gear 33 on the side of the damping means on the right side while the hook body 31 is return rotated from the deployed position to the prescribed intermediate position, and the rack 34*a* on the left side of the slider 35 engages with the lower end of the gear 33 on the side of the damping means on the left side while the hook body 31 is return rotated from the deployed position to the prescribed intermediate position. The entire length of the rack 34*a* of the slider 35 is shorter than the dimension of movement of the slider 35, and it is made such that after the hook body 31 reaches the prescribed intermediate position, the place of the slider 35 where there is no rack 34*a* is positioned beneath the lower end of the gear 33 on the side of the damping means.

By this, in this example, before the return rotational movement of the rotating body M reaches the prescribed intermediate position, the return rotational movement of the rotating body M is made slower by applying the damping forces of the two damping means 39, 39 simultaneously to the rotating body M, on the other hand, after the return rotational movement of the rotating body M reaches the prescribed intermediate position, the return rotational movement of the rotating body M is made faster by making it such that neither damping force of the two damping means 39, 39 is applied to the rotating body M.

(Fourth Embodiment)

Figure 15:
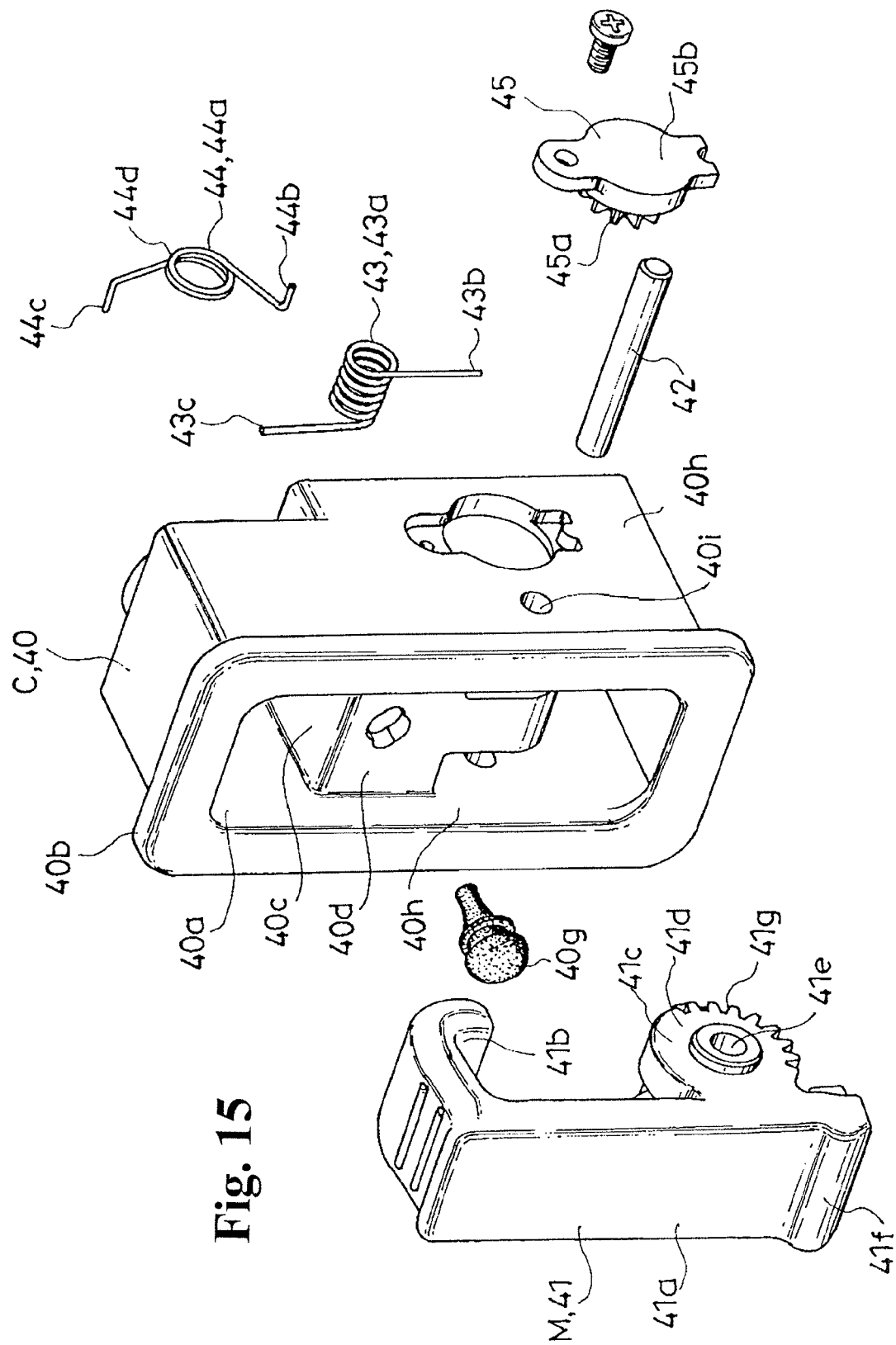
FIG. 15 is an exploded perspective view of an apparatus according to a fourth embodiment.
Figure 16:
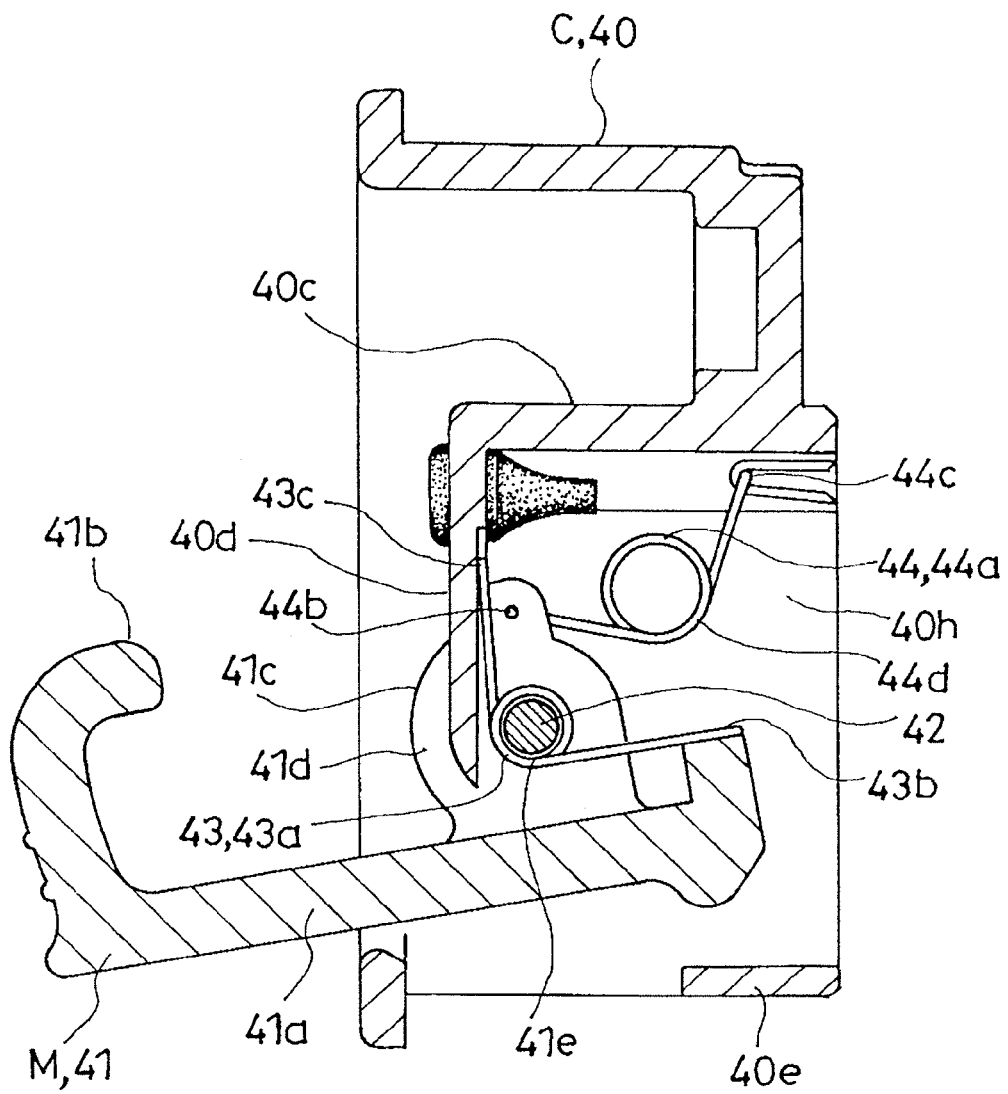
FIG. 16 is a sectional side view thereof according to the fourth embodiment showing a state when the rotating body is in the deployed position.
Figure 17:
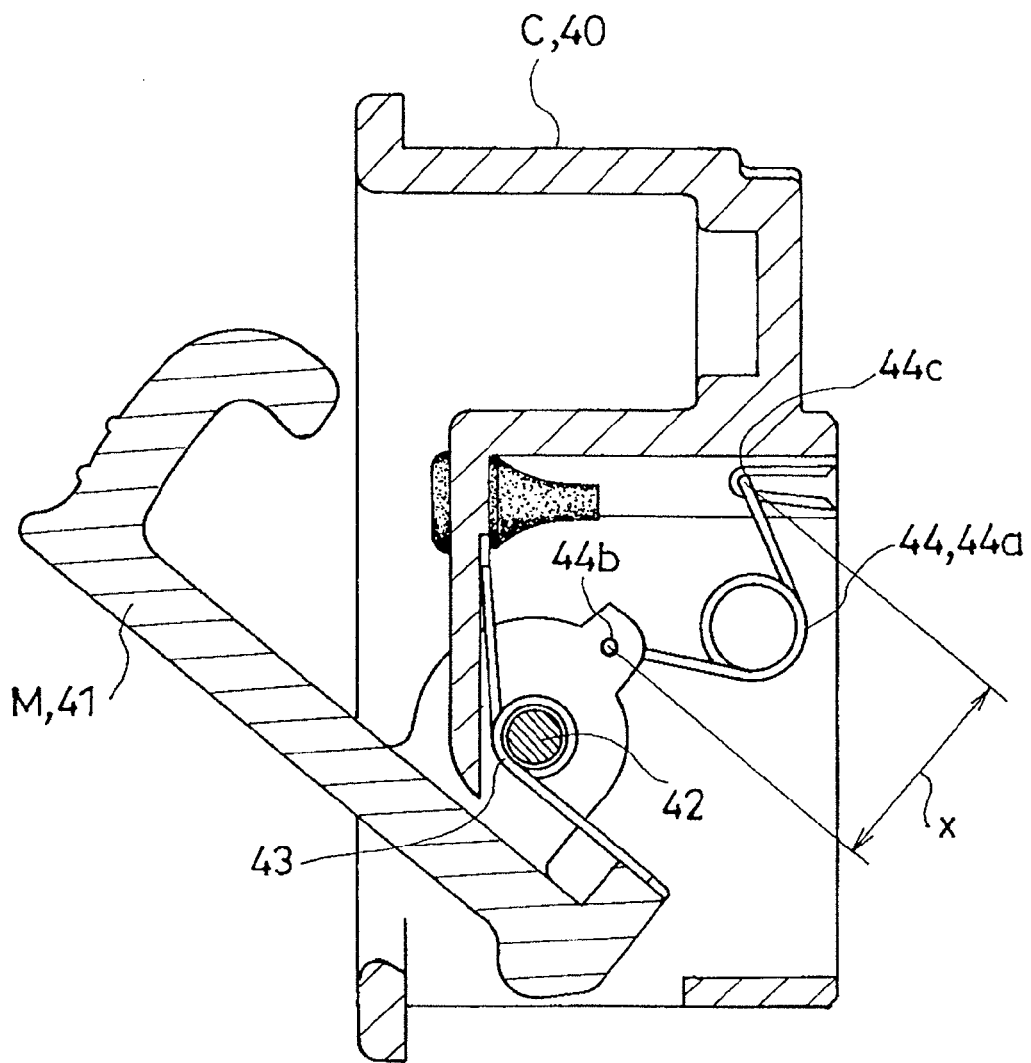
FIG. 17 is a sectional side view thereof according to the fourth embodiment showing a state when the rotating body is in the prescribed intermediate position.
Figure 18:
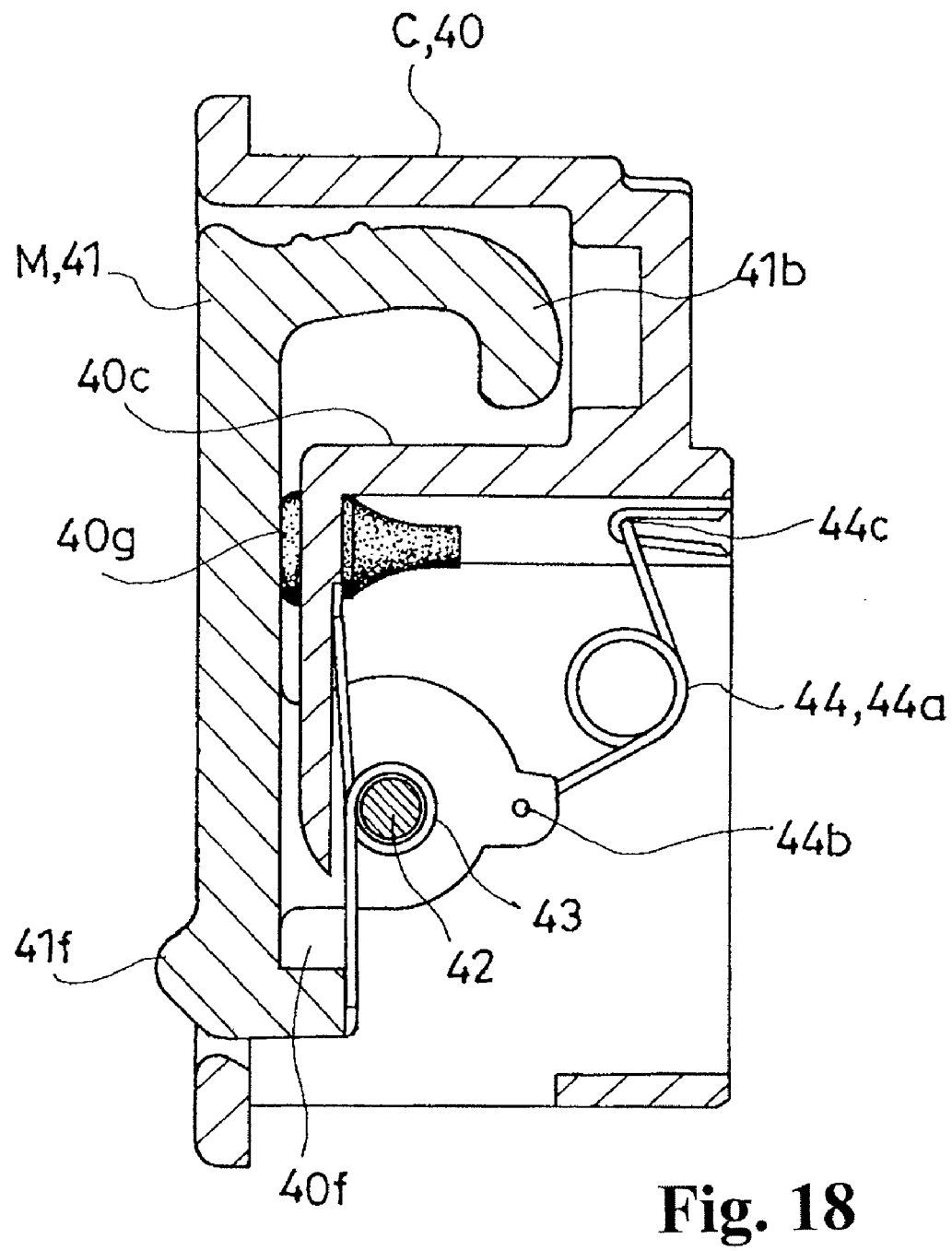
FIG. 18 is a sectional side view thereof according to the fourth embodiment showing a state when the rotating body is in the standard position.
Figure 19:
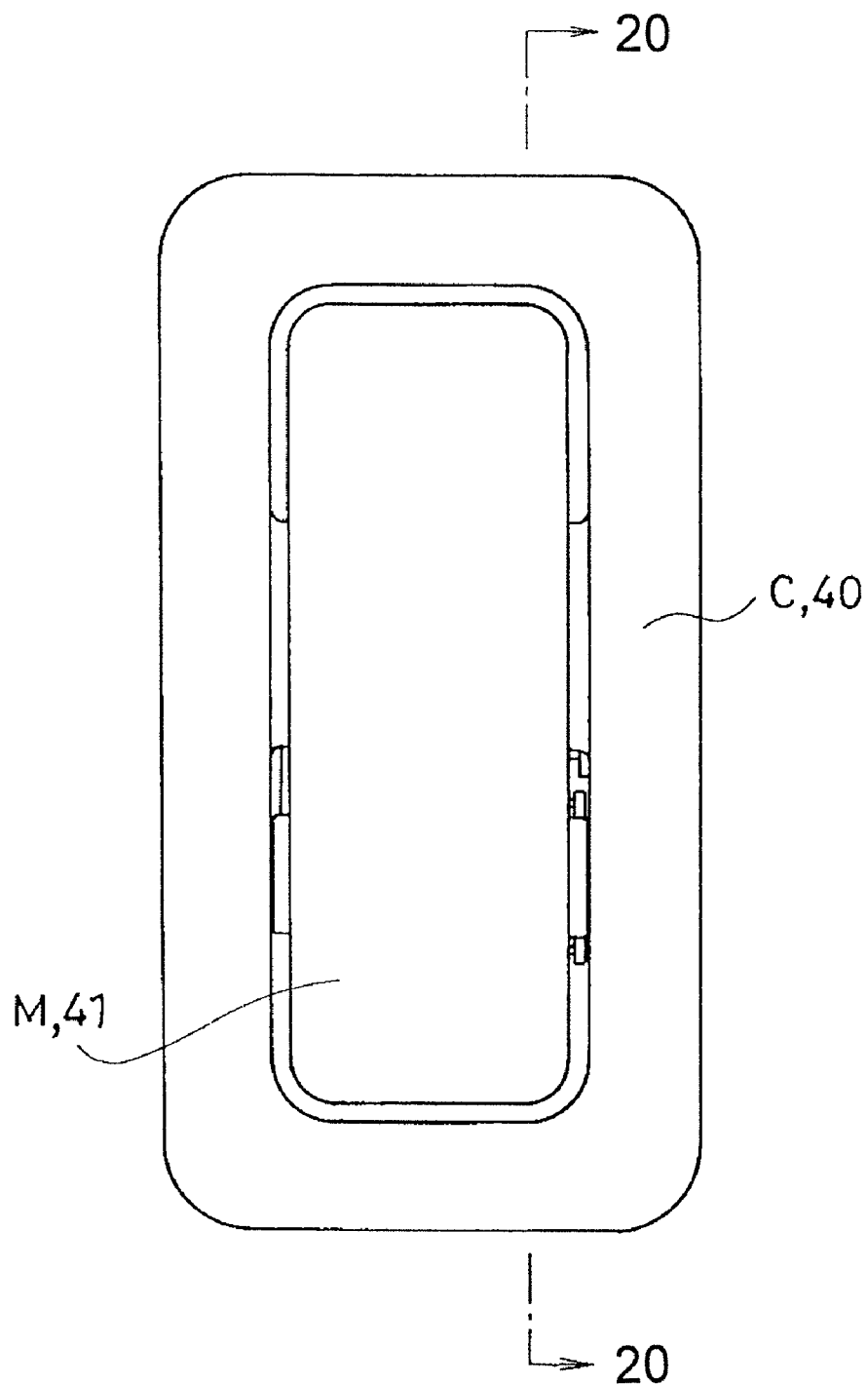
FIG. 19 is a front view of apparatus according to the fourth embodiment.
Figure 20:
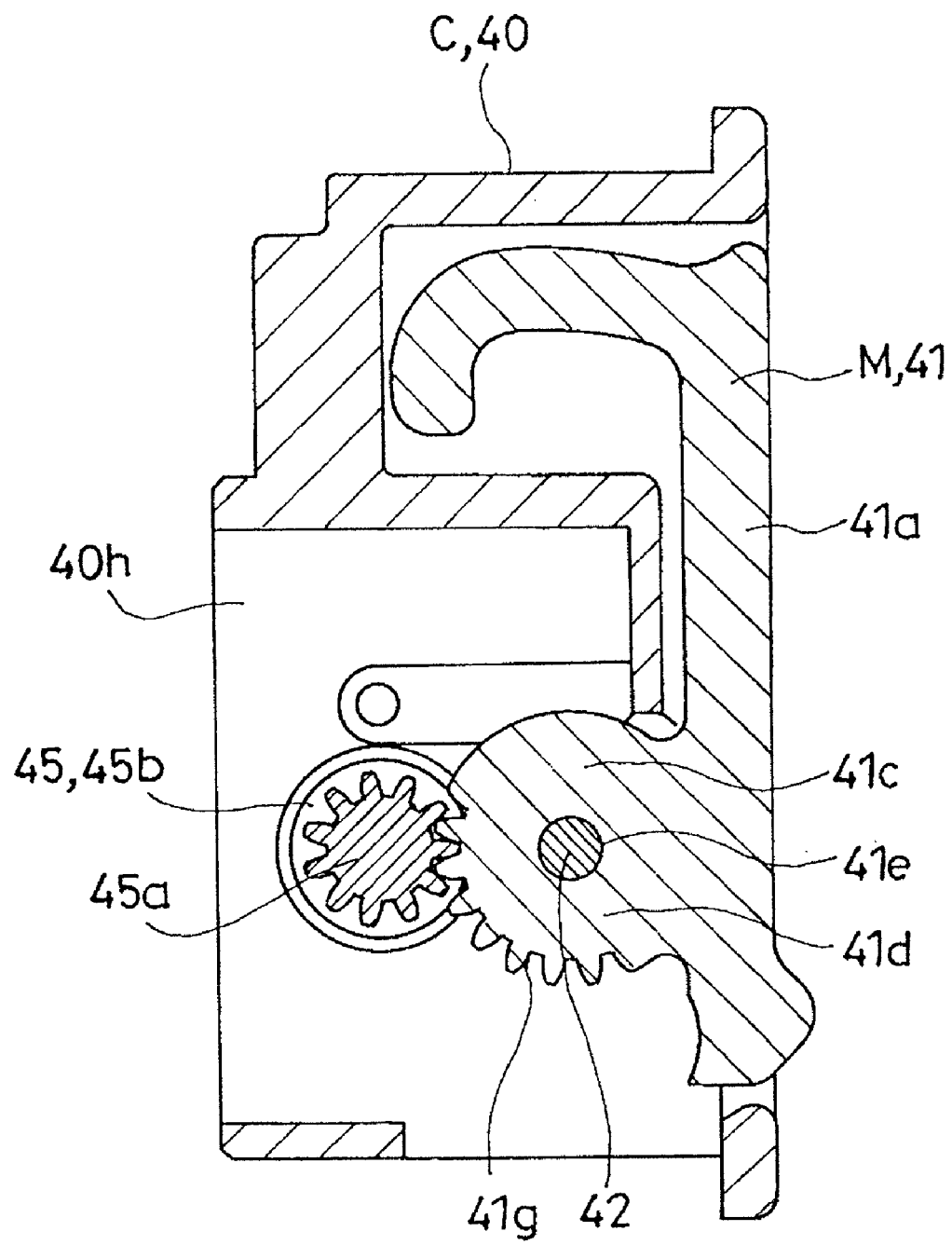
FIG. 20 is a sectional view taken along line 20-20 in FIG. 19.

FIG. 15 to FIG. 20 show an example when said rotating body M is made as a hook body 41 and said supporting body C is made as a case body 40 for holding this hook body 41 in the standard position. FIG. 15 shows its constituent parts disassembled, and FIG. 16, FIG. 17, and FIG. 18 show the apparatus pertaining to this fourth example in sectional view, in the state when the rotating body M is in the deployed position, the state when the rotating body M is in the prescribed intermediate position, and the state when the rotating body M is in the standard position, respectively. FIG. 19 shows the apparatus according to the fourth embodiment in the condition viewed from the front, and FIG. 20 shows this in sectional view at a different, position from FIG. 15 to FIG. 17. Also, FIGS. 21(*a*), 21(*b*), 21(*c*) show models of the change of the biasing forces (FIG. 21(*a*) and FIG. 21(*c*)), and the change of a composite biasing force (FIG. 21(*b*)), of two torsion coil springs 43, 44*a* constituting the apparatus according to the fourth embodiment.

In this example, the case body 40 serving as the supporting body C is constituted such that it has a box shape with the front face opened and the open edges of this opening 40*a* formed in a roughly rectangle shape being long in the vertical direction. The case body 40 has an outer flange 40*b* around that opening 40*a*, and it is made such that this outer flange 40*b* is inserted into an attachment hole formed on the inner wall, or the like, inside the cabin of an automobile, or the like (not shown), up to a position where it is hooked in this attachment hole, whereby it is installed in such cabin.

Meanwhile, the hook body 41 serving as the rotating body M has a width about equal to the width of the opening 40a of said case body 40, and it has a plate-shaped base part 41a which is roughly rectangle shaped having a length made shorter than the length of this opening 40a, a hook-shaped part 41b which projects about perpendicularly to one face on one end side of this plate-shaped base part 41a and the projecting end is bent toward the other end side of this plate-shaped base part 41a, and a shaft bearing part 41c which is formed between the one end and the other end on one face of the plate-shaped base part 41a. The shaft bearing part 41c has through-holes 41e respectively on left and right plate parts 41d, 41d. In the illustrated example, such left and right plate parts 41d, 41d respectively are constituted such that they have an about circular shape with the edge part other than the place of coupling with the plate-shape base part 41a bent into an arc shape. Also; a shaft 42 is passed through pass-through holes 40i formed on the left and right side plates 41d, 41d of the case body 40 into the through-holes 41e of the shaft bearing part 41c of the hook body 41, whereby the hook body 41 is assembled onto the case body 40 to be capable of rotational movement centered on this shaft 42.

In the standard position, the plate-shaped base part 41a of the hook body 41 is positioned on about the same plane as the outer flange 40b of the case body 40, and it is made such that the opening of this case body is closed by the hook body (FIG. 18).

Such hook body 41 is made so as to be positioned in this standard position by a torsion coil spring 43, having the shaft 42 between the left and right plate parts 41d, 41d of the hook body 41 passed through the spring coil part 43a, and having one end 43b of the spring fixed to the side of this hook body 41 and the other end 43c of the spring fixed to the case body 40, and by a torsion coil spring 44a of an auxiliary biasing means 44 to be described later. In the illustrated example, the case 40 has a horizontal partitioning plate 40c inside thereof which divides the case body 40 into two parts, and a vertical blind plate 40d positioned between said left and right plate parts 41d, 41d extending downward from the other end of this horizontal partitioning plate 40c facing the side of the opening 40a. Said shaft 42 is positioned behind this blind plate 40d. Also, between the lower end of the blind plate 40d and the bottom plate 40e of the case body 40, there is formed a lead-in gap 40f, which allows rotational movement of the hook body 41 to the deployed position, on the other end side of the plate-shaped base part 41a of this hook body 41. Also, in the standard position the hook-shaped part 41b of the hook body 41 is made so as to be taken into the space above the partitioning plate 40c. Also, on the front face of the blind plate 40d, there is attached a cushion body 40g which is hit by one fact of the plate-shaped base part 41a of the hook body 41 when in the standard position. The other end 43c of the spring of said torsion coil spring 43 is pushed from underneath against the back face of such blind plate 40d, also, the one end 43b of the spring is pushed against the side of one face of the plate-shaped base part 41a of the hook body 41 at a place further below than the shaft 42. On the other face on the other end side of the plate-shaped base part 41a of the hook body 41, there is formed a raised part 41f for operation. In the illustrated example, it is made such that the hook body 41 in the standard position can be operated to be turn-down rotated about 90 degrees toward the deployed position by using the raised part 41f for operation. When the hook body 41 is turn-down rotated from the standard position to the deployed position, the one end 43b of the spring of said torsion coil spring 43 is moved upward and the spring coil part 43a comes to be elastically deformed, whereby when the hook body 41 is not in the standard position, biasing force in the direction of causing the hook body 41 to be return rotated to the standard position is applied to the hook body 41.

Also, in this example, the speed switching means is constituted by an auxiliary biasing means 44 which changes the direction of impulsion on this rotating body M between before and after the rotational movement of the rotating body M reaches the prescribed intermediate position. By this, in this example, it can be made such that the return rotational movement of the rotating body M by said impulsion becomes faster up to the prescribed intermediate position, or becomes slower up to the prescribed intermediate position, by such auxiliary biasing means 44.

In the illustrated example, such speed switching means is constituted by a torsion coil spring 44a, with one end 44b of the spring fixed to one of the left and right plate parts 41d, 41d constituting the shaft bearing part 41c of the hook body 41, and the other end 44c of the spring fixed to the case body 40, and the spring coil part 44d left free. Such torsion coil spring 44a is disposed beneath the partitioning plate 40c of the case body 40 and behind the blind plate 40d, and the one end 44b of the spring is pivotally, fixed on one of the left and right plate parts 41d, 41d behind the shaft 42 at about the same level as the shaft 42 when the hook body 41 is in the standard position. Also, the other end 44c of the spring of such torsion coil spring 44a is pivotally fixed inside a sideplate 40h of the case body 40 positioned beneath the partitioning plate 40c further back from the one end 44b of the spring. In the illustrated example, such pivotal fixing is accomplished by inserting the bent end of the torsion coil spring 44a in a small hole with the hole axis made to follow the axis of the shaft 42. The coil axis of the spring coil part 44d of such torsion coil spring 44a is made parallel to the axis of the shaft 42.

Also, in this example, it is made such that when the hook body 41 of the rotating body M is rotated spanning between the standard position and the deployed position, the track of movement of the one end 44b of the spring of such torsion coil spring 44a comes to follow the arc of an imaginary circle centered on the shaft 42, and when the hook body 41 is in the prescribed intermediate position between the standard position and the deployed position, the gap x between the one end 44b of the spring and the other end 44c of the spring of such torsion coil spring 44a becomes narrowest (FIG. 17). Also, it is made such that when the hook body 41 is in this prescribed intermediate position, the one end 44b of the spring, the other end 44c of the spring of such torsion coil spring 44a, and the axial center of the shaft 42 are positioned on about the same straight line.

Figure 21A:
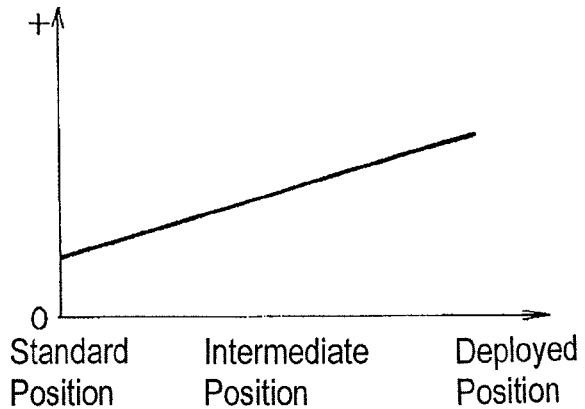
Figure 21B:
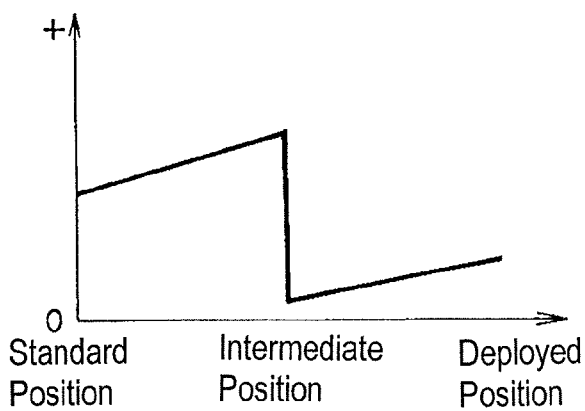
Figure 21C:
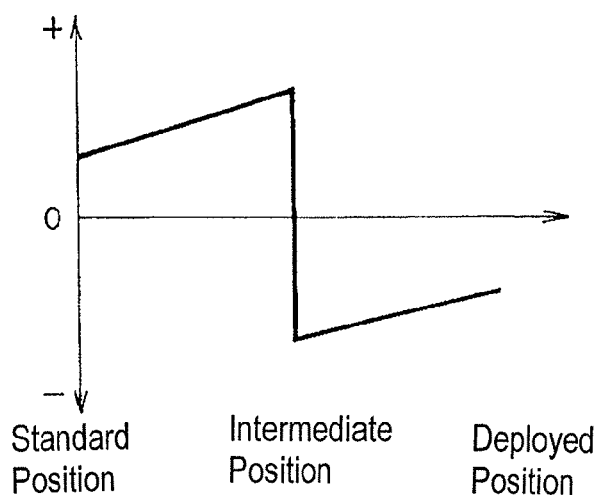

By this, in this example, the biasing force on the hook body 41 becomes a composite (FIG. 21(b)) of the biasing force of said torsion coil spring 43 (FIG. 21(a)) which is positioned having said shaft 42 passed through the spring coil part 43a, and the biasing force of said torsion coil spring 44a (FIG. 21(c)), which has the spring coil part 44d left free. The biasing force of former torsion coil spring 43 becomes greater as the hook body 41 approaches the deployed position (FIG. 21(a)), but the biasing force of the latter torsion coil spring 44a becomes zero when the hook body 41 is in the prescribed intermediate position. On the other hand, as it goes from this prescribed intermediate position toward the standard position, the biasing force toward this standard position is made gradually smaller, and as it goes from this prescribed intermediate position toward the deployed position, the biasing force toward this deployed position is made gradually smaller (FIG. 21(c)). Also, the biasing force of the former torsion coil spring 43 is made so as to always become greater than the biasing force of the latter torsion coil spring 44a which biases the hook body 41 toward the deployed position when the hook body 41 is between the prescribed intermediate position and the deployed position. (In this FIG. 21, the vertical axis of each graph shows the biasing forces of the springs 43, 44a, and the horizontal axis shows the amount of rotational movement of the hook body 41 from the standard position, and the amount of rotational movement becomes greater going toward the right in each graph.)

By this, in this example, first, the state of the hook body 41 being in the standard position is kept stable by the two torsion coil springs 43, 44a. Also, second, up to the prescribed intermediate position, a force of a magnitude to oppose both impulsions of these two torsion coil springs 43, 44a is required for the hook body 41 to be rotationally operated toward the deployed position, and from this prescribed intermediate position, the hook body 41 can be rotationally operated toward the deployed position with the aid of the impulsion of the latter torsion coil spring 44a while opposing only the impulsion of the former torsion coil spring 43. Also, third, when the hook body 41 is left free in the deployed position, the hook body 41 return rotates slowly while opposing the impulsion of the latter torsion coil spring 44a while the speed of rotational movement is gradually reduced by as it approaches the prescribed intermediate position by the impulsion of the former torsion coil spring 43, and next, from the prescribed intermediate position, it rotationally returns to the standard position with the speed made faster by both impulsions of the two torsion coil springs 43, 44a. That is, in this example, the function of making the return rotational movement of the rotating body M by impulsion slower up to the prescribed intermediate position can be assured by two torsion coil springs 43, 44a.

Also, in this example, there is provided a damping means 45 which regularly applies damping force to the rotational movement of the hook body 41 serving as the rotating body M. In the illustrated example, such damping means is constituted as one which regularly applies damping force to the rotation of a pinion 45a which regularly engages with a gear part 41g being a rack formed on the edge of the other side of the left and right plate parts 41d and 41d (the side of the left and right plate parts 41d, 41d where the one end 44b of the spring of said torsion coil spring 44a is not fixed) constituting the shaft bearing part 41c of the hook body 41. Concretely, such damping means 45 has a stator body 45b and a rotor body (not shown), and it is constituted as a so-called rotary damper constituted so as to apply resistance to the rotation of such rotor body. The application of such resistance to the rotor body for example can be assured by sealing in a viscous fluid such as silicon oil inside the stator body 45b. Said pinion 45a is provided on the side of such damping means 45 in a manner such that the center of rotation is fixed on the outer end of such rotor body and the axis of rotation is disposed in the left-right direction. In this example, such stator body 45 is fixed to one of the left and right side plates 40h, 40h of the case body 40. By this, in this example, it is made such that the return rotational movement of the hook body 41 from the deployed position to the prescribed intermediate position is accomplished one level more slowly.

While the invention has been explained with reference to the specific embodiments of the invention, the explanation is illustrative and the invention is limited only by the appended claims.

What is claimed is:

1. An apparatus comprising:
  a supporting body;
  a rotating body rotatably situated in the supporting body to rotate at least between a standard position and a deployed position through an intermediate position;
  a biasing device having one end attached to the rotating body and another end attached to the supporting body, for applying a biasing force to the rotating body in a direction of returning the rotating body to the standard position; and
  a speed switching device provided on the supporting body for changing a rotational speed of the rotating body from the deployed position to the intermediate position different from that from the intermediate position to the standard position in a return rotational movement of the rotating body,
  wherein the speed switching device comprises at least two damping devices; at least two first gears attached to the damping devices for applying damping forces of the damping devices to the rotating body; and at least two second gears formed integrally on the rotating body,
  one of the damping devices is partially engaged with one of the second gears to change a damping force applying to the rotating body before and after the return rotational movement of the rotating body reaches the intermediate position, and
  one of the second gears has teeth always engaging with one of the first gears, and another of the second gears has a toothless part that is disengaged from another of the first gears during a period from the standard position to the intermediate position and a toothed part engaging with another of the first gears during a period from the deployed position to the intermediate position.

* * * * *